(12) United States Patent
Zuffa

(10) Patent No.: US 7,766,643 B2
(45) Date of Patent: Aug. 3, 2010

(54) MOULDING THREADED ARTICLES

(75) Inventor: Zeno Zuffa, Borgo Tossignano (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 686 days.

(21) Appl. No.: 11/628,717

(22) PCT Filed: Jun. 6, 2005

(86) PCT No.: PCT/IB2005/001587

§ 371 (c)(1),
(2), (4) Date: Mar. 2, 2007

(87) PCT Pub. No.: WO2005/120796

PCT Pub. Date: Dec. 22, 2005

(65) Prior Publication Data

US 2007/0292554 A1    Dec. 20, 2007

(30) Foreign Application Priority Data

Jun. 7, 2004    (IT)    .......................... MO2004A0144

(51) Int. Cl.
B29C 43/42    (2006.01)
B29C 43/50    (2006.01)
B29C 33/48    (2006.01)

(52) U.S. Cl. ...................... 425/441; 425/442; 425/552; 425/556

(58) Field of Classification Search ................. 425/441, 425/442, 809, DIG. 58, 556, 547
See application file for complete search history.

(56) References Cited

U.S. PATENT DOCUMENTS

| | | | | |
|---|---|---|---|---|
| 2,038,205 A | * | 4/1936 | Case ........................... | 425/423 |
| 2,425,004 A | * | 8/1947 | Rabell ......................... | 28/118 |
| 2,585,000 A | * | 2/1952 | Friddell ....................... | 99/373 |
| 2,981,976 A | | 5/1961 | Maier | |
| 2,983,959 A | | 5/1961 | Shapero et al. | |
| 3,771,928 A | * | 11/1973 | Gostyn et al. ............... | 425/4 R |
| 4,529,372 A | | 7/1985 | Saumsiegle | |
| 5,037,289 A | * | 8/1991 | Ohta et al. .................. | 425/532 |
| 5,372,774 A | * | 12/1994 | Lupke ......................... | 264/508 |
| 5,470,221 A | * | 11/1995 | Gaiser ......................... | 425/556 |
| 5,540,582 A | * | 7/1996 | Catalanotti et al. .......... | 425/577 |
| 5,707,661 A | * | 1/1998 | Thompson .................. | 425/442 |
| 6,401,587 B1 | * | 6/2002 | Beltrandi .................... | 83/879 |
| 6,416,312 B1 | | 7/2002 | Gonser et al. | |
| 6,435,857 B1 | * | 8/2002 | Mitteregger et al. ........ | 425/556 |

FOREIGN PATENT DOCUMENTS

| | | |
|---|---|---|
| DE | 101 36 391 | 2/2003 |
| JP | 03-222708 | 10/1991 |
| WO | 01/15879 | 3/2001 |
| WO | 02/083388 | 10/2002 |
| WO | 03/072333 | 9/2003 |
| WO | 2004/103674 | 12/2004 |

* cited by examiner

Primary Examiner—Yogendra N Gupta
Assistant Examiner—Emmanuel S Luk
(74) Attorney, Agent, or Firm—Nixon & Vanderhye P.C.

(57) ABSTRACT

An apparatus comprises a forming arrangement closable in a direction to form an object, said forming arrangement comprising at least two reciprocal movable elements along respective arched trajectories to disengage from said object, said arched trajectories having respective components parallel to said direction.

149 Claims, 22 Drawing Sheets

MOULDING THREADED ARTICLES

This application is a continuation of PCT International Application No. PCT/IB2005/001587 filed on Jun. 6, 2005. PCT/IB2005/001587 claims priority to IT Application No. MO2004A000144 filed on Jun. 7, 2004. The entire contents of these applications are incorporated herein by reference.

The invention relates to apparatuses and a method for forming, particularly by injection-moulding or compression-moulding, objects made of plastics. The apparatuses and the method according to the invention are particularly suitable for producing caps for containers and bottles, heads of tubes for packaging and preforms for bottles made, for example, of polyethyleneterephthalate (PET).

Italian patent application RM 2002A000099 discloses an apparatus for producing, by compression-moulding, preforms in plastics, for example PET, to be used in the blowing of bottles. The apparatus comprises a carousel that is rotatably movable around a vertical axis and is peripherally provided with a plurality of moulds. Each mould comprises a die and a punch that is movable in relation to the die in a vertical opening direction. The punch can move between an opening position in which between the die and the punch it is possible to introduce a dose of plastics to be formed, and a closing position in which the punch engages with the die, defining a forming chamber inside which the preform is formed.

The die comprises a fixed part connected fixedly relative to the carousel and suitable for shaping a portion of substantially cylindrical preform from which the body of the bottle will be subsequently obtained by blow-moulding. The die furthermore comprises two movable elements suitable for externally shaping the neck of the preform, which is provided with a threaded portion and with a collar provided with undercuts. The movable elements each have a "C"-shaped portion internally provided with a forming surface suitable for obtaining the neck of the preform from a part of the dose, and having an end fixed relative to a lever. The levers are in turn hinged on a column parallel to the opening direction of the mould and can rotate on a plane orthogonal to the opening direction between a disengagement position in which the movable elements are spaced from one another and a contact position in which the movable elements are in contact with one another in such a way as to define a portion of the forming chamber. In order to keep the radial overall dimensions of the carousel on which the moulds are assembled limited, the length of the levers is rather reduced, i.e. the "C"-shaped portions of the movable elements are near the column.

The latter is slideable parallel to the opening direction of the mould between an upper position, in which the movable elements are at a certain distance, measured parallel to the opening direction on the fixed part of the die, and a lower position in which the movable elements are in contact with this fixed part.

At the start of the forming phase, a dose of plastics is introduced into the fixed part of the die. The punch is located in the opening position, the movable elements are arranged in the disengagement position and the column is in the upper position in which the movable elements are kept far from the fixed part of the die. Subsequently, a cam mechanism moves the movable elements from the disengagement position to the contact position, after which the column moves to take the movable elements to the lower position in contact with the fixed part of the die. Also the punch moves parallel to the opening direction until reaching the closing position in which forming of the preform occurs. At the end of the forming phase, the operations disclosed previously have to be performed again in reverse order.

A drawback of the mould disclosed in RM 2002A000099 is that relatively long strokes are necessary to move the movable elements from the contact position to the disengagement position so as to be able to extract a preform from the mould. The movable elements in fact have to rotate in relation to one another by an angle of significant amplitude in order that the ends of the "C"-shaped portions that are fixed relative to the lever move away from one another by an amount such as to enable the undercuts formed on the neck of the preform, and in particular the collar, to be completely disengaged from the movable elements.

Furthermore, in the mould disclosed in RM 2002A000099 it is necessary to provide a first driving mechanism, normally of hydraulic type, to move the punch between the opening position and the closing position and a second driving mechanism, comprising the column and the cam mechanism and arranged outside the punch and the die, to move the movable elements. This significantly complicates the structure of the apparatus. Furthermore, it is not always easy to manage the first and second driving mechanism in a coordinated manner so as to move the punch and the movable elements with precision and according to a preset sequence.

The doses of plastics that are introduced inside the mould may have a weight, and therefore a volume, that is slightly variable between one dose and the next. There is thus the risk of obtaining variations in the dimensions of the moulded objects as the weight of the dose varies, which may not be acceptable.

A mould is known for obtaining by compression-moulding a head that is suitable for being joined to a tubular body so as to form a tube for toothpaste or other paste-like substances. The head comprises a frustum-conical portion from which an externally threaded neck extends. The known mould comprises a die suitable for forming the external surface of the frustum-conical portion and the threaded surface of the neck, and a punch cooperating with the die to form the internal surface of the head. The punch and the die are movable in relation to one another between an opening position in which they are arranged at a certain distance from one another to receive a dose of plastics, and a closing position in which they interact to form the head. The die comprises a plurality of sectors that are movable away from one another to disengage from the threaded neck of the head. At the end of the forming phase, after the punch has moved away from the die, the sectors that compose the die move away from one another, disengaging the head, which falls through gravity onto a collecting surface underneath.

The ways of falling of the head onto the collecting surface are practically uncontrolled and the heads may get arranged on the collecting surface with different orientations and in undesired positions. It is therefore necessary to provide, downstream of the mould, orientation devices that arrange the heads in an ordered position in such a way that subsequent control and viewing devices can monitor correctly the quality of the obtained heads.

An object of the invention is to improve the apparatuses and the methods for forming objects, particularly by means of compression- or injection-moulding of plastics.

A further object is to provide apparatuses for forming an object that are provided with movable elements for disengaging from the formed object with shorter strokes in relation to the known apparatuses.

A still further object is to provide apparatuses for forming an object that are provided with movable elements for disengaging from the formed object, in which the movable elements can be driven more simply in relation to the known apparatuses.

Another object of the invention is to provide apparatuses that are able to form objects provided with good dimensional precision even when they are obtained from doses of variable weight.

Still another object of the invention is to provide apparatuses and methods that enable the formed objects to be removed from the mould in controlled conditions and to be deposited on a collecting surface in a desired orientation.

In a first aspect of the invention, there is provided an apparatus comprising a forming arrangement closable in a direction to form an object, said forming arrangement comprising at least two reciprocally movable elements along respective arched trajectories to disengage from said object, wherein said arched trajectories have respective components parallel to said direction.

Owing to this aspect of the invention, an apparatus is obtained in which the movable elements disengage from the formed object, performing relatively limited strokes.

For example, if the apparatus comprises a plurality of forming arrangements assembled peripherally on a carousel rotatable around an axis parallel to the aforementioned direction, the arched trajectories of the movable elements can extend around a point arranged in a position relatively far from the object being formed, without causing an unacceptable increase of the radial dimensions of the carousel. This enables the angular shifts of the movable elements to be limited. Furthermore, the movable elements can start to disengage from the formed object whilst the forming arrangement is opening, which results in an increase in productivity.

In a second aspect of the invention, there is provided an apparatus comprising a forming arrangement closable in a direction to define a forming chamber having a portion provided with a transverse dimension extending transversely to said direction and adjacent to a further portion of lesser transverse dimensions in relation to said transverse dimension, said forming arrangement being decomposable into a first part and at least two movable elements in relation to said first part, wherein said at least two movable elements are positionable in relation to said first part in such a way that said portion is defined by adjacent zones of said at least two movable elements and of said first part.

Owing to the second aspect of the invention, an apparatus is obtained that is provided with movable elements that can be moved away from one another to disengage from a formed object, performing strokes of limited extent. The transverse dimension of the forming chamber measured transversely to the closing direction of the forming arrangement, which in the particular case of forming preforms is the same as the diameter of the collar, is in fact jointly defined by the movable elements and by the first part of the forming arrangement and as such does not give rise to undercuts on the formed object. To extract from the forming arrangement the portion of forming chamber having such a transverse dimension, it is thus necessary to move away the movable elements from one another by a quantity that is less than the stroke that would be required if the portion were entirely defined by the movable elements, as occurs in RM 2002A000099.

In a third aspect of the invention, there is provided an apparatus comprising a forming arrangement partially included in a casing and closable in a direction to form an object, said forming arrangement comprising at least two movable elements that are drivable by a moving arrangement along respective trajectories having a transverse component in relation to said direction to disengage from said object, wherein said moving arrangement is assembled in said casing.

Owing to this aspect of the invention, an apparatus having a particularly simple structure is obtained. The moving arrangement assembled on the casing of the forming arrangement has limited overall dimensions and can be managed in a simpler manner in relation to the case in which the moving arrangement is totally outside the forming arrangement.

Furthermore, by assembling the moving arrangement in the casing in which the forming arrangement is partially housed, it is possible to move the forming arrangement, together with the movable elements and the corresponding moving arrangement, along a preset path inside the apparatus. In particular, this path may extend across a plurality of carousels, so as to increase the time available for introducing the dose into the forming arrangement.

In a fourth aspect of the invention, there is provided an apparatus comprising a first forming device and a second forming device suitable for interacting in a closing position to define a chamber for forming a dose of plastics, said second forming device comprising a first member suitable for coming into contact with said first forming device and a second member, wherein in said closing position said second member is movable in relation to said first forming device by an elastic member to vary the volume of said chamber according to the weight of said dose.

Owing to the fourth aspect of the invention, it is possible to obtain objects provided with high dimensional precision, even when doses of plastics are processed that have even small weight variations.

In a fifth aspect of the invention, there is provided an apparatus comprising a forming device and forming and compensator device, suitable for interacting in a direction to define in a closing position a chamber for forming a dose of plastics, said chamber having a maximum longitudinal dimension in said direction, wherein said forming and compensator device is positionable in relation to said forming device in such a way as to define a dimension of said chamber in said direction, different from said maximum longitudinal dimension, substantially independent of the weight of said dose.

Owing to the fifth aspect of the invention, it is possible to obtain objects provided with great dimensional precision even when doses of plastics having weight variations have to be processed. The configuration of the forming and compensator device in fact enables the position of an end wall of an object to be formed to be altered without varying the distance between respective active surfaces of the forming device, which determine a thickness of the object. It is thus possible to keep constant the thickness between an object formed in a given pressing cycle and that of a subsequent pressing cycle in zones of these objects in which it is desired to obtain great dimensional precision.

In a sixth aspect of the invention, there is provided an apparatus comprising a punch and a die suitable for interacting to form an object, wherein it furthermore comprises a centring element suitable for engaging with a portion of said object to support said object when said punch and said die disengage from each other.

In a seventh aspect of the invention, there is provided a method comprising forming an object by a punch and a die, spacing said die and said punch away from said object, wherein, during said spacing, there is provided supporting said object.

The apparatus and the method according to the sixth and seventh aspect of the invention enable the object to be kept in a controlled position whilst the punch and the die disengage from the formed object. In this way the formed object is prevented from being released in undesired positions or falling onto a collecting surface underneath with unwanted orientations. Any orientation devices arranged downstream of the punch or of the die are therefore superfluous.

The invention can be better understood and implemented with reference to the attached drawings, which illustrate some embodiments thereof by way of non-limitative example, in which.

Figure 1:
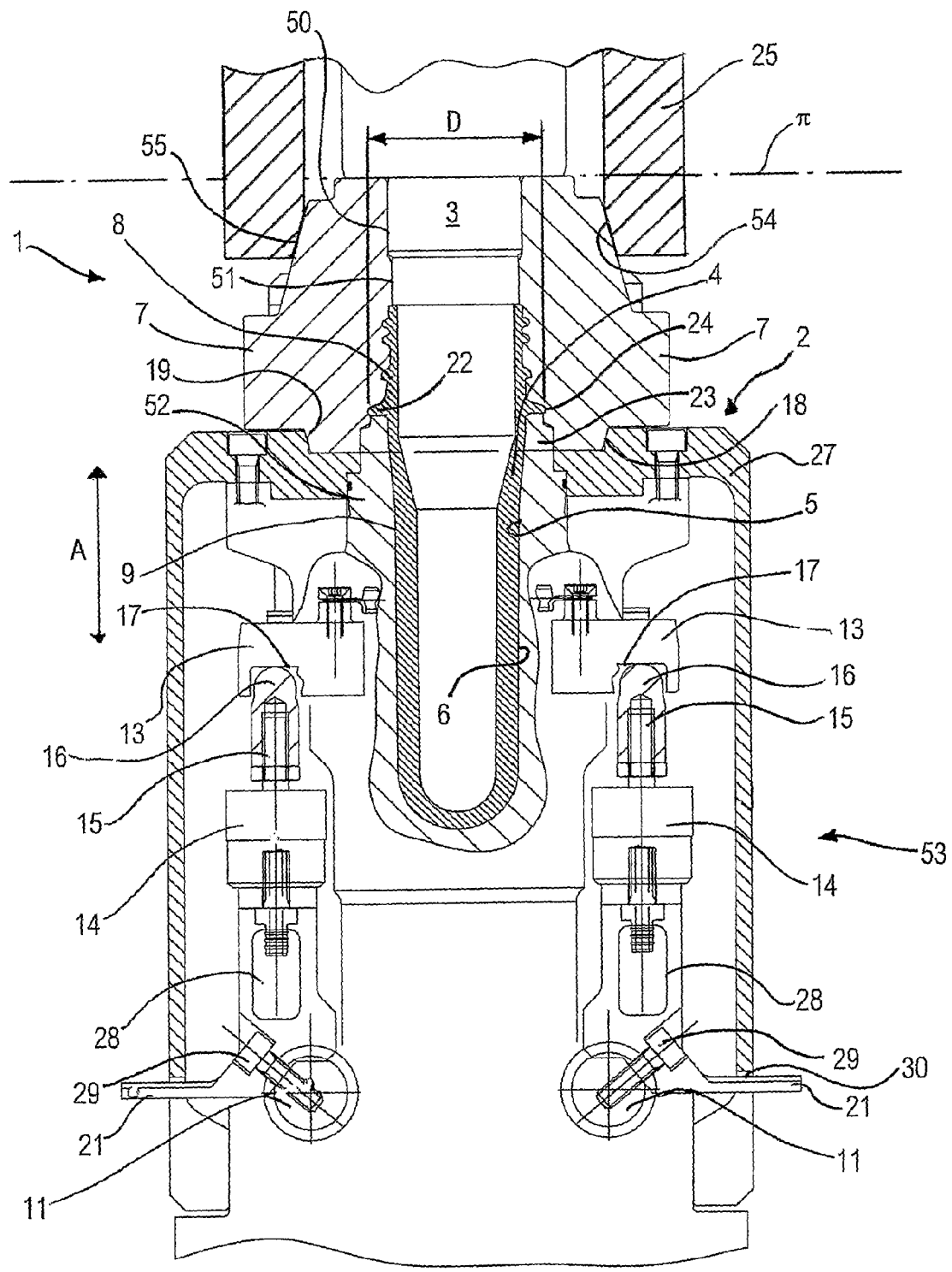
FIG. 1 is a partially sectioned front and fragmentary view of a mould for forming preforms in a closing position.

With reference to FIGS. 1 to 4 there is shown a mould 1 of an apparatus for forming preforms 4 by compression-moulding of a plastics material, for example polyethyleneterephthalate (PET). The preforms 4 formed in the mould 1 can be subsequently used to obtain bottles by means of blow-moulding.

The apparatus may comprise a plurality of moulds 1 arranged peripherally on a carousel rotatable around an axis in such a way that each mould 1 describes a circular trajectory during rotation of the carousel. Along the circular trajectory each mould 1 is placed in an opening position in which a dose of plastics to be formed is introduced inside it. Subsequently, the mould 1 is closed by pressure to form the dose so as to obtain a preform 4, which remains in the closed mould for a sufficient time to ensure its stabilisation and cooling. The mould 1 is then opened again to extract the finished preform 4 and a new dose of plastics to be formed is introduced therein.

The mould 1 comprises a forming arrangement closable in a direction A to form a preform 4 from a dose of plastics in a viscous liquid state (more or less viscous). The forming arrangement comprises a punch 3 that reproduces the internal shape of the preform 4 and a die 2 that is decomposable into a first part 52 in which a recess 5 is obtained and into a pair of movable elements 7. In the recess 5 a substantially cylindrical external surface 6 of the preform 4 is shaped, whereas the movable elements 7 form a threaded portion 8 of the preform 4. During the subsequent process of blow-moulding of the preforms 4, the threaded portion 8 does not undergo substantial shape variations.

Figure 3:
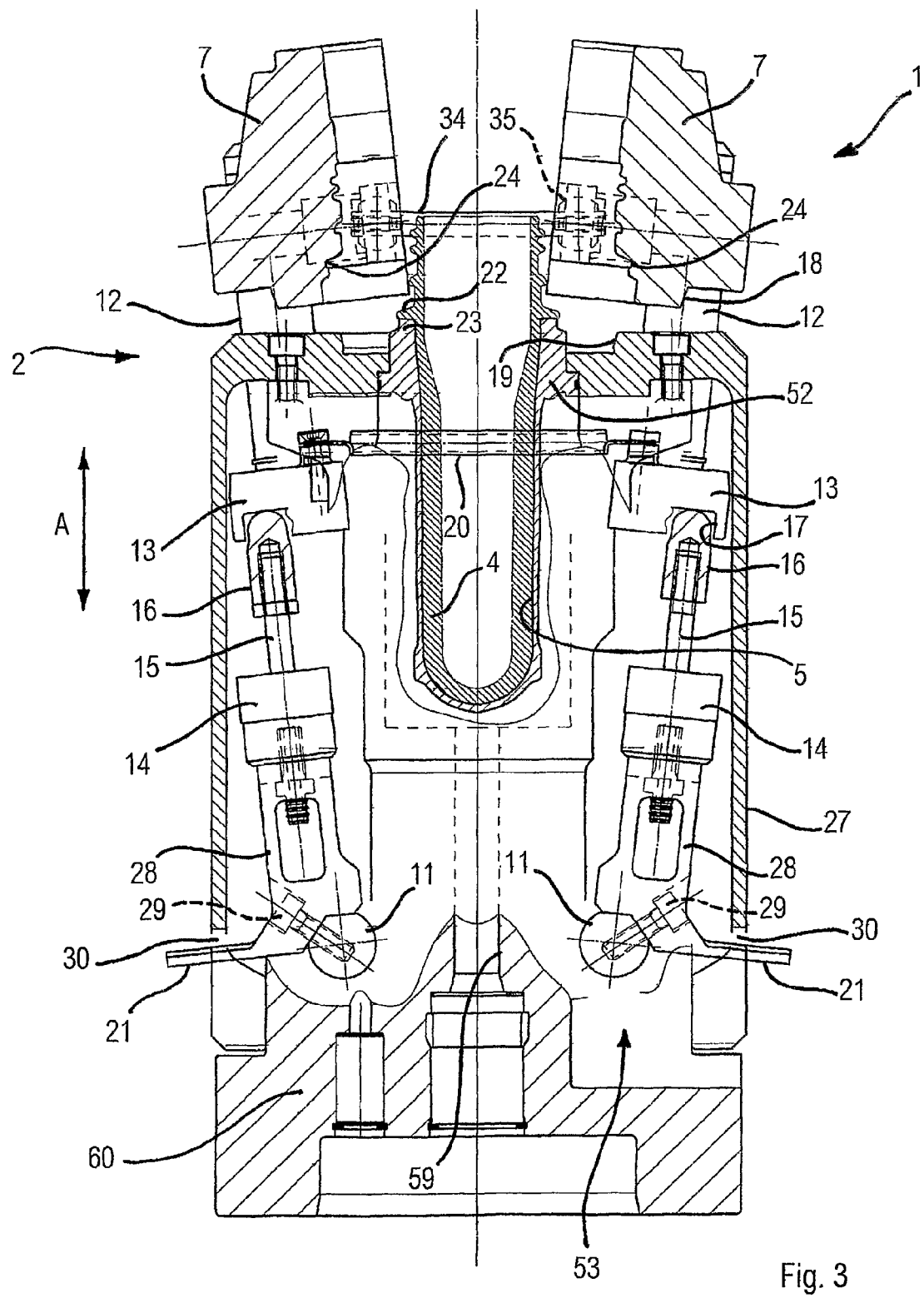
FIG. 3 is a view like the one in FIG. 1 showing the mould in an opening position.

The die 2 is movable in relation to the punch 3 in the direction A between a closing position, shown in FIG. 1, and an opening position, shown in FIG. 3. In the closing position the punch 3 is in contact with the movable elements 7 of the die 2 along a closing plane π that is transverse in relation to the direction A. In particular, both the movable elements 7 are in the same semispace identified by the closing plane π. Furthermore, the punch 3 is in contact with the movable elements along a first cylindrical surface 50 and a second cylindrical surface 51 that are arranged in an upper region of the punch 3 to ensure the centring of the punch 3 in relation to the movable elements 7 and the closure of the mould 1. Between the punch 3 and the die 2 a chamber 9 is defined in which the preform 4 is formed.

In the opening position the die 2 is on the other hand far from the punch 3, so that the preform 4 can be extracted from the mould 1.

Figure 2:
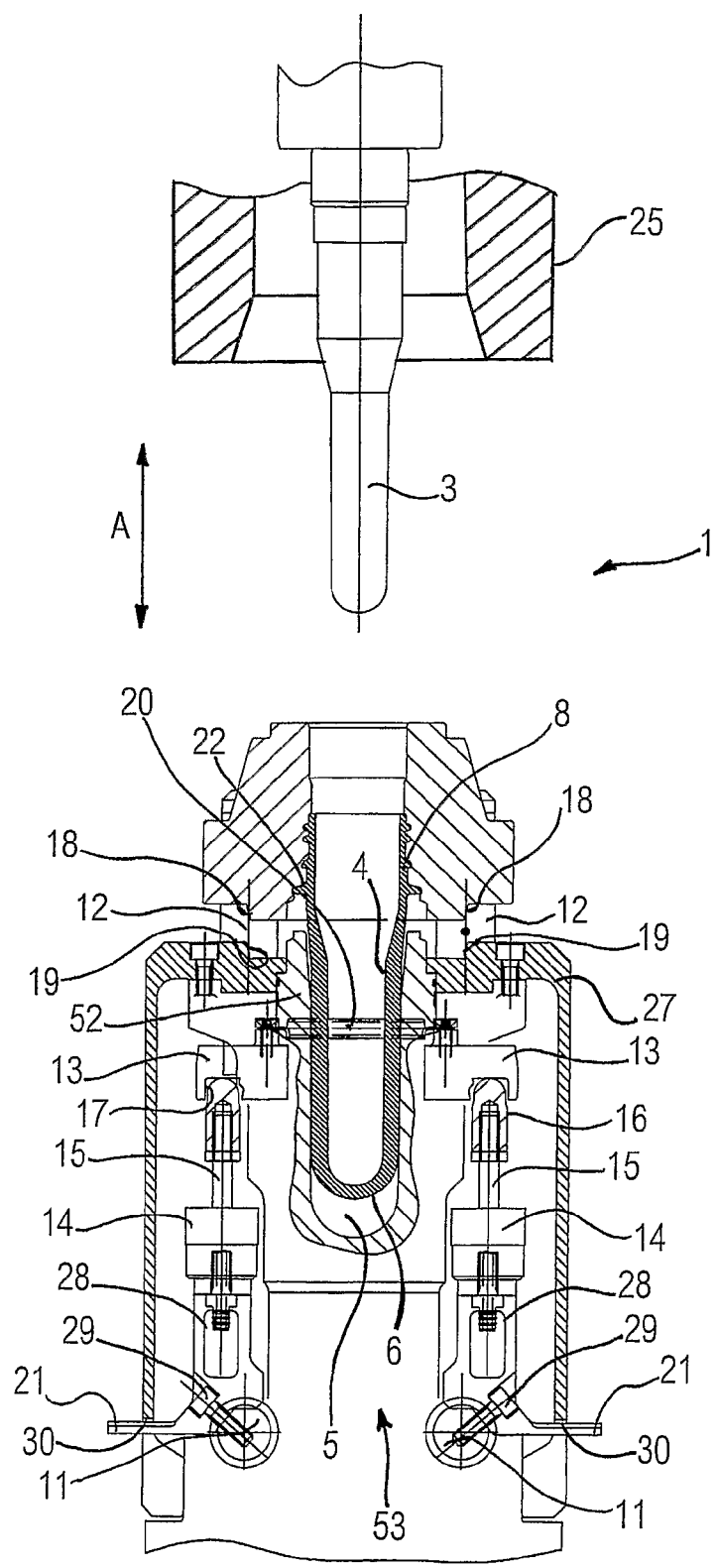
FIG. 2 is a view like the one in FIG. 1 showing the mould in an intermediate position.

The movable elements 7 are reciprocally movable, owing to a moving arrangement 53, between a contact position, shown in FIGS. 1 and 2, in which the movable elements 7 have been brought near to one another, and a disengagement position, shown in FIG. 3, in which the movable elements 7 are spaced apart from one another. The moving arrangement 53 is assembled inside a casing 27 in which the first part 52 of the die 2 is housed and has a structure that will be disclosed in detail below.

Figure 4:
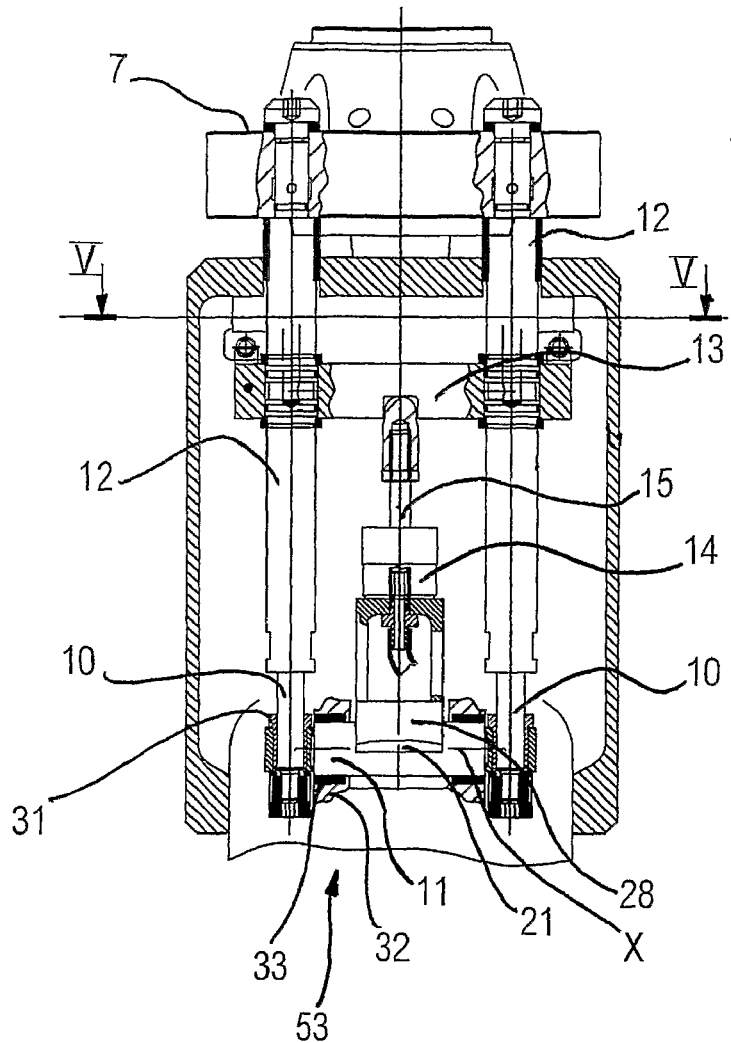
FIG. 4 is a partially sectioned and fragmentary side view of the mould in FIG. 1.
Figure 5:
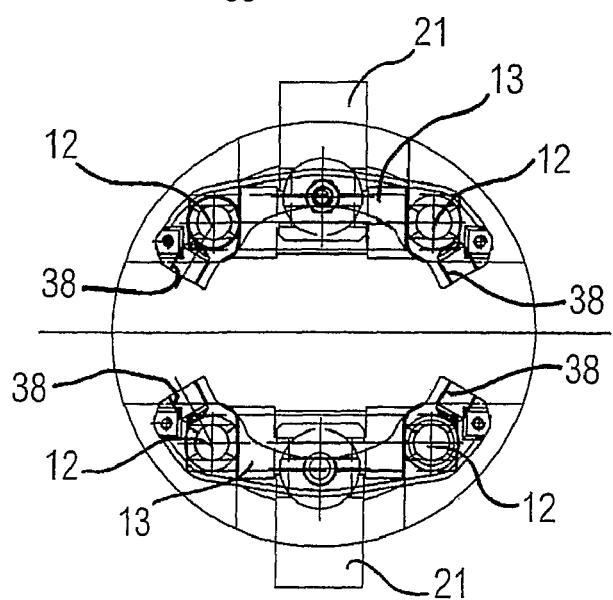
FIG. 5 is a plan view taken along the plane V-V in FIG. 4.

As shown in FIGS. 2 to 4, the moving arrangement 53 comprises two crosspieces 13, each connected to a respective movable element 7 by a pair of columns 12, provided below with respective shanks 10. The columns 12 are movable in motion of translation in the direction A to move the movable elements 7 between a lower position, shown in FIG. 1, and an upper position, shown in FIG. 2. In the lower position, a coupling surface 18 obtained on each movable element 7 and provided with a substantially frustum-conical shape, engages in a shapingly coupled manner with a complementary coupling surface 19 obtained on the casing 27. In the upper position, the movable elements 7 are spaced away from the casing 27 in such a manner as to disengage the coupling surfaces 18 from the complementary coupling surfaces 19.

Each movable element 7 is driven between the lower position and the upper position by a respective actuator 14, for example of the pneumatic type, from which a stem 15 protrudes on which a head 16 is fitted that engages in a hollow 17 obtained on the crosspiece 13.

Each actuator 14 is assembled on an end of a support element 28 provided with an intermediate portion fixed by a screw 29 to a pivot 11 extending along an axis X, perpendicular to the direction A. On the support element 28, a lever 21 is obtained that extends transversely in relation to the stem 15 in such a way as to give the support element 28 an "L" shape. The lever 21 projects towards the outside of the casing 27 through a passage 30 and is drivable by a driving device of known type that is not shown, for example a cam or a system of the rod/tappet type.

As shown in FIG. 4, the pivots 11 are rotatably assembled in seats 32 by guide bushes 33. At the ends of each pivot 11 there are fixed respective further bushes 31 that support the shanks 10 of the columns 12. By using each lever 21, it is possible to rotate the support element 28 and the pivot 11 fixed thereto around the axis X. The actuator 14, the pair of columns 12 and the crosspiece 13 associated with the support element 28 rotate connected to the pivot 11 to rotate the respective movable element 7 along an arched trajectory having a shift component parallel to the direction A and a further shift component perpendicular to the direction A. This means that, in the embodiment of the FIGS. 1 to 5 in which the punch 3 and the die 2 interact in a vertical direction A, each point of the movable elements 7 moves on a vertical plane perpendicular to the rotation axis X of each pivot 11.

The movement of the movable elements 7 along the arched trajectory enables even objects to be extracted from the mould 1 that are provided with external undercuts such as threads on the threaded portion 8 of the preform 4 or a collar 22 provided in the joint zone between the external surface 6 and the threaded portion 8 of the preform 4. To do so, limited rotations of the movable elements 7 are necessary. In fact, the pivots 11 around which the movable elements 7 rotate can be positioned at a relatively great distance from the movable elements 7 without influencing the radial dimensions of a possible carousel on which the moulds 1 are assembled. This enables the movable elements 7 to move away from one another by the distance required to extract the preforms 4, without, however, performing very large rotations.

As shown in FIG. 1, the collar 22 is provided with a diameter D that extends transversely in relation to the direction A. In this specific case, the diameter D is the maximum transverse dimension of the preform 4. The collar 22 is formed by adjacent zones of the first part 52 and of the movable elements 7. More in particular, a zone protruding 23 from the first part 52 that is projected outside the casing 27 shapes the collar 22 below, whilst a notch 24 obtained in the movable elements 7 forms the remaining surfaces of the collar 22.

This conformation of the movable elements 7 and of the first part 52 enables the stroke of the movable elements 7 that is required to extract the preform 4 from the mould 1 to be reduced. As in fact the surfaces of the mould 1 that shape the collar 22 belong to distinct parts that are movable in an independent manner, the collar 22 does not define an undercut on the mould 1.

Above the movable elements 7, a ring element 25 is provided that is shown in FIG. 1 that is provided below with a frustum-conical surface 54 that is suitable for engaging in a shapingly coupled manner with further frustum-conical surfaces 55 obtained on the movable elements 7. When the frustum-conical surface 54 is in contact with the further frustum-conical surfaces 55, the ring element 25 keeps the movable elements 7 in the contact position, preventing them from moving away from one another.

Figure 7:
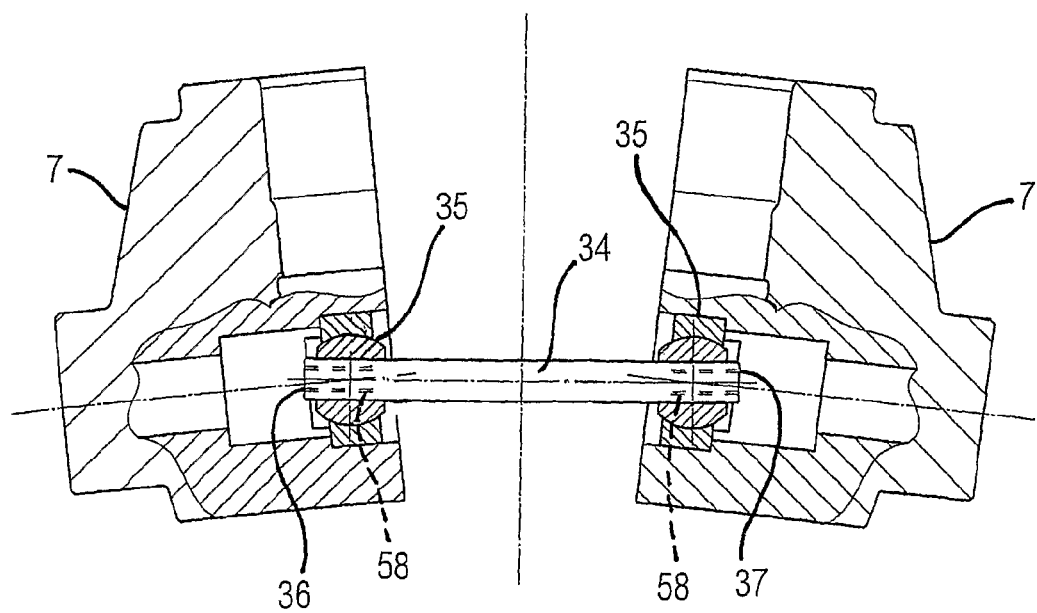
FIG. 7 is a view like the one in FIG. 6, showing the movable elements in a disengagement position.
Figure 7A:
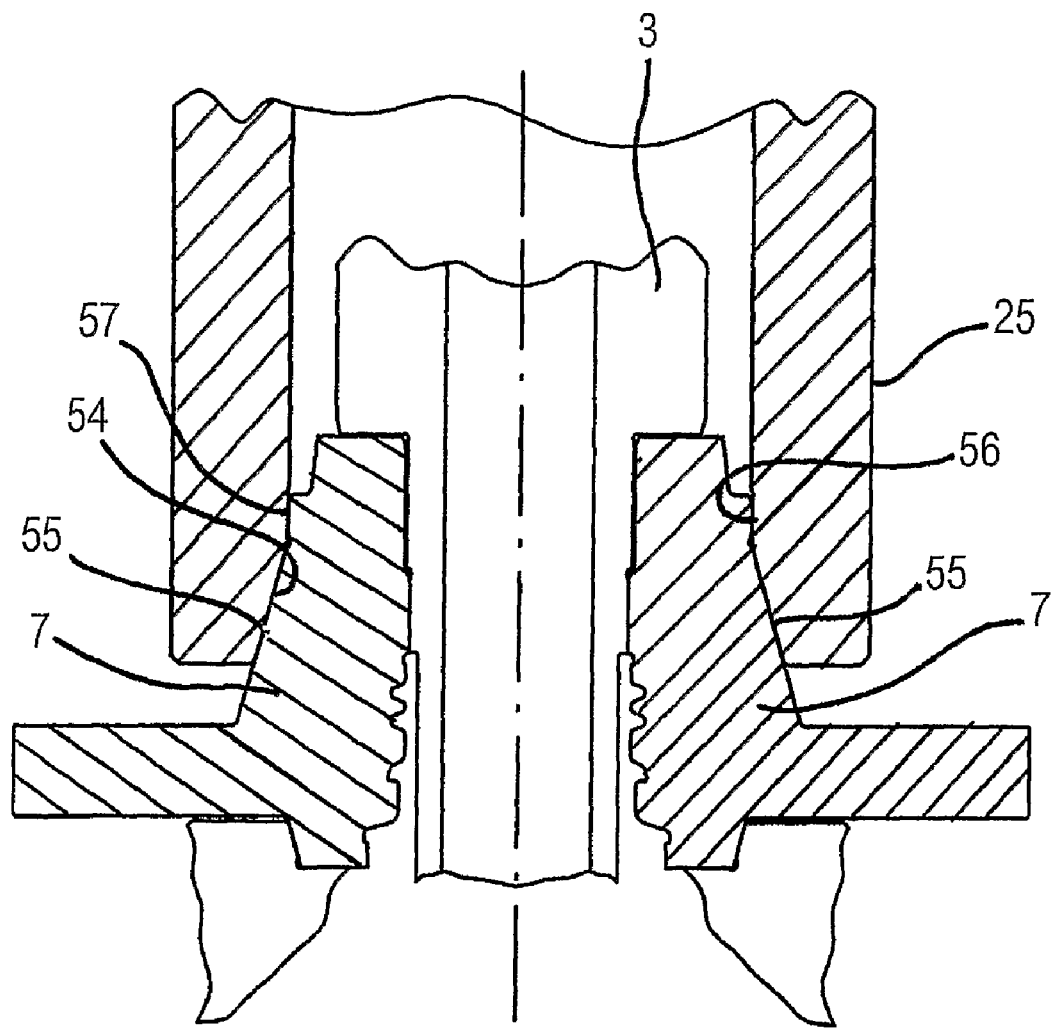
FIG. 7a is a partially sectioned enlarged and fragmentary schematic view of two movable elements kept in contact by a ring element.

In an alternative embodiment, shown in FIG. 7a, the ring element 25 interferes with the movable elements 7 not only along the frustum-conical surface 54, but also along a cylindrical surface 56 which, when the mould 1 is closed, engages in a shapingly coupled manner with further cylindrical surfaces 57 obtained on the movable elements 7.

Figure 6:
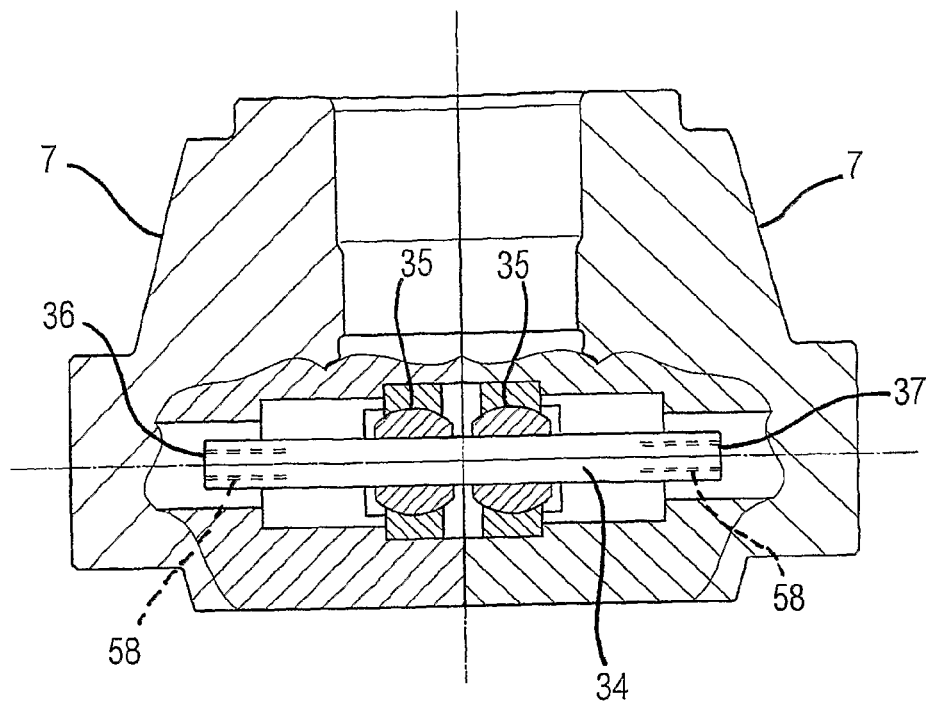
FIG. 6 is a section view of two movable elements of the mould in FIG. 1, in a contact position.

The mould 1 furthermore comprises an aligning device, shown in detail in FIGS. 6 and 7, which ensures correct positioning in relation to the movable elements 7 in the contact position. The aligning device comprises a pair of rods 34, only one of which is shown in FIGS. 6 and 7, arranged on opposite sides of the movable elements 7. Each rod 34 extends in a direction that is transverse in relation to the direction A and comprises a first end region 36 associated with a movable element 7 and a second end region 37 associated with the other movable element 7. With each rod 34 a pair of articulated joints 35 are furthermore associated in a slidable manner, each of which is assembled on a movable element 7. The first end region 36 and the second end region 37 are each provided with a fixing hole 58 by means of which it is possible to connect the first end region 36 and the second end region 37 to respective arrest elements that are not shown. The arrest elements ensure that the rods 34 do not come out of the articulated joints 35 when the movable elements 7 move from the contact position to the disengagement position.

In the disengagement position of the movable elements 7, shown in FIG. 7, the articulated joints 35 are arranged near the first end region 36 and the second end region 37 of each rod 34. When the moving arrangement 53 takes the movable elements 7 to the contact position shown in FIG. 6, the articulated joints 35 move towards one another by sliding along the respective rod 34, until they are arranged in a central region of the rod. In this way the movable elements 7 are guided during their movement by the articulated joints 35 and by the rods 34, having the function of ensuring that in the contact position, the movable elements 7 are always arranged in the same corresponding configuration.

With the mould 1 a cooling device is associated comprising a refrigerant fluid circulating in a cooling circuit so as to reduce the temperature of the preform 4 that has just been formed. In particular, the refrigerant fluid reaches the movable elements 7 by means of conduits obtained inside the columns 12 and communicating with further conduits obtained in the crosspieces 13. The latter are provided with threaded holes 38, shown in FIG. 5, suitable for receiving respective connections for the entry and exit of the refrigerant fluid. As shown in FIG. 3, the refrigerant fluid also circulates outside the first part 52 of the die 2, which is reached through another conduit 59 obtained in a support member 60 arranged inside the casing 27.

During operation, a preform 4 is formed from a dose of plastics during a forming phase in which the die 2 and the punch 3 are in the closing position, as shown in FIG. 1. The movable elements 7 are located in the lower position in which the coupling surfaces 18 are in contact with the complementary coupling surfaces 19 of the casing 27. The frustum-conical surface 54 of the ring element 25 is engaged in a shapingly coupled manner with the further frustum-conical surfaces 55 of the movable elements 7, preventing the latter from moving away from one another transversely to the direction A through the effect of the thrusts generated by the plastics inside the chamber 9.

The mould 1 remains in this configuration even in a subsequent stabilisation and cooling phase, in which the preform 4 is cooled owing to refrigerant fluid circulating in the movable elements 7 and outside the first part 52 of the die 2.

At the end of this phase, the die 2 moves downwards in the direction A to move away from the punch 3. The ring element 25 moves fixedly relative to the die 2 by keeping the movable elements 7 in the contact position. In this position, the movable elements 7 are firmly tightened on the threaded portion of the preform 4, which detaches itself from the punch 3. Subsequently, the ring element 25 stops its stroke, whilst the die 2 continues to move away from the punch 3 moving in direction A. The further frustum-conical surfaces 55 thus detach themselves from the frustum-conical surface 54 and the ring element 25 stops interacting with the movable elements 7.

As shown in FIG. 2, in a subsequent instant, the actuators 14 move the crosspieces 13 upwards in direction A. The columns 12, the shanks 10 of which move in motion of translation inside the further bushes 31, take the movable elements 7 to the upper position in which the coupling surfaces 18 are disengaged from the complementary coupling surfaces 19.

At this point, the levers 21 are rotated around the respective X axes and move the movable elements 7 to the disengagement position in FIG. 3, overcoming the force exerted by two traction springs 20, each one of which is arranged transversely to the direction A and is provided with an end connected to a crosspiece 13 and with a further end connected to the other crosspiece 13. In the disengagement position, the movable elements 7, guided by the aligning device, move away from the threaded portion 8. The preform 4 can now be extracted from the recess 5 by means of an extraction device of the known type. The movable elements 7, by moving from the contact position to the disengagement position, cause a small lifting of the preform 4 from the recess 5, which nevertheless does not produce negative effects on the preform 4.

When the preform 4 has been extracted from the recess 5, the levers 21 are released and the traction springs 20 return the movable elements 7 to the contact position. At this point, the columns 12, through the action of the force of gravity and/or of the actuators 14, move the movable elements 7 to the lower position and it is possible to start a new forming cycle. During this phase, the aligning device prevents corresponding shifts of the movable elements 7.

A compensating device of the known type can be associated with the mould 1 to take into account variations in the weight of successive doses.

The movable elements provided with a moving arrangement assembled in the casing that houses the recess 5 define forming units that are particularly suitable not only for being assembled on a rotating carousel, but also for being moved outside the rotating carousel along a path that makes the forming units interact with a plurality of carousels. This path enables the time available to insert the dose inside the die to be increased.

Furthermore, providing die comprising movable elements enables the volume of the forming cavity defined by the die to be increased compared with cases in which the die comprises only the first part 52 and the movable elements are associated with the punch. For the same dose weight, this enables the risk of parts of the dose exiting from the cavity to be reduced.

In an embodiment that is not shown, the apparatus may comprise a plurality of moulds of the known type disclosed above placed next to one another in a rectilinear arrangement.

In a further embodiment that is not shown, each mould can be used to form objects, for example preforms, by injection-moulding. In this case, with each mould an injection conduit is associated to introduce fluid plastics into the mould.

In another embodiment that is not shown, the mould 1 comprises more than two movable elements, for example three or four movable elements that are drivable between a contact position and a disengagement position in similar ways to those disclosed previously.

It is furthermore also possible to provide a mould having movable elements included in the die and further movable elements associated with the punch.

The mould can be provided with fixed die and with a movable punch to enable the preform 4 to be formed and extracted.

Figure 8:
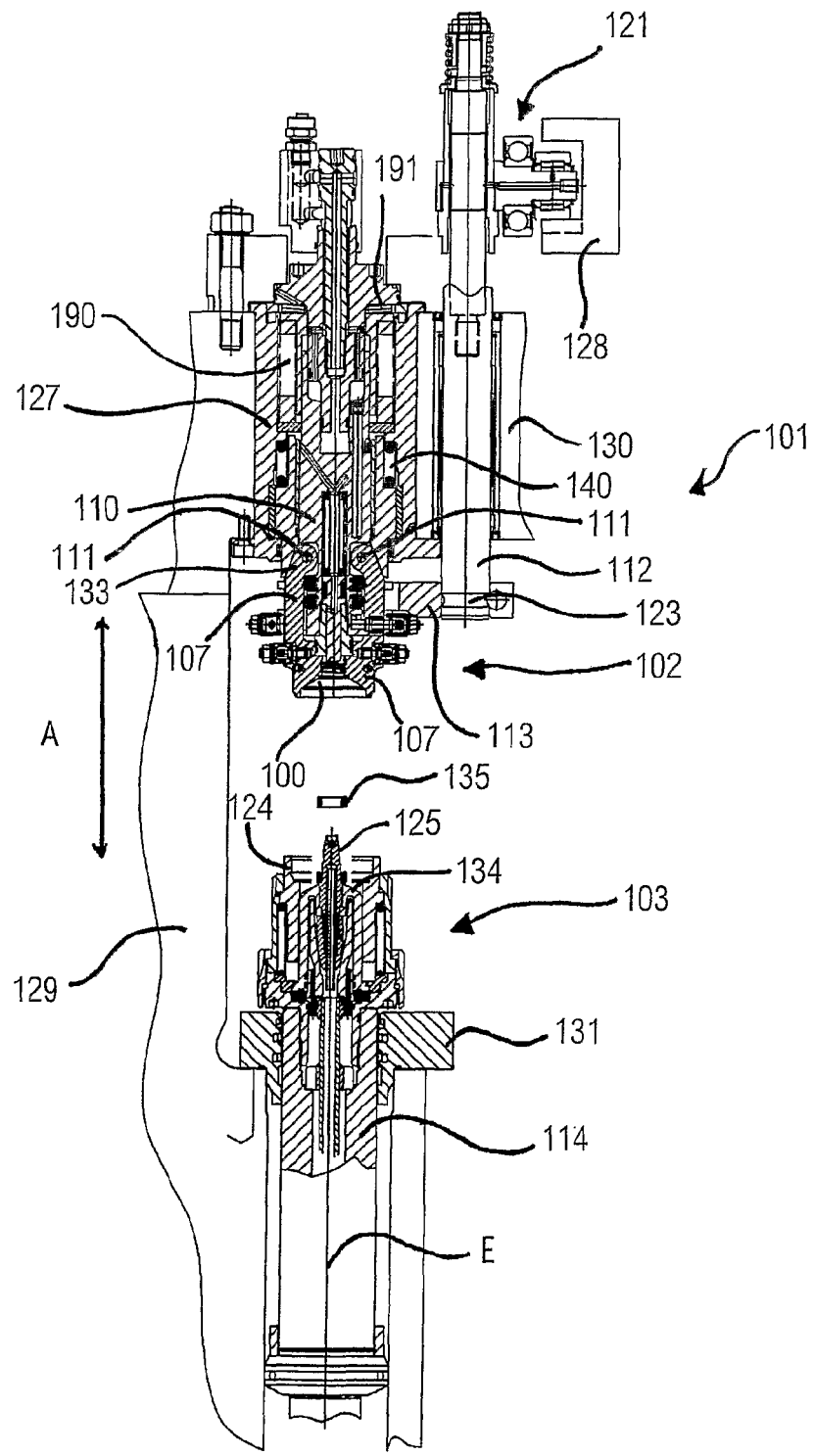
FIG. 8 is a partially sectioned side view of a portion of an apparatus for forming heads of tubes showing a mould in an opening position.

With reference to FIGS. 8 to 14, there is shown a mould 101 of an apparatus for forming heads 104 for example of tubes of toothpaste, by compression-moulding of plastics. The apparatus may comprise a plurality of moulds 101, arranged peripherally on a rotating carousel 129 as previously disclosed for the apparatus for forming preforms. Each mould 101 is initially located in an opening position, shown in FIG. 8, in which a dose 135 of plastics to be formed is introduced therein. The dose 135 can be ring-shaped, as shown in FIG. 8, or can be compact, for example sphere-shaped or cylinder-shaped. It is also possible to introduce two or more compact doses into the mould 101 to obtain a head 104.

Figure 11:
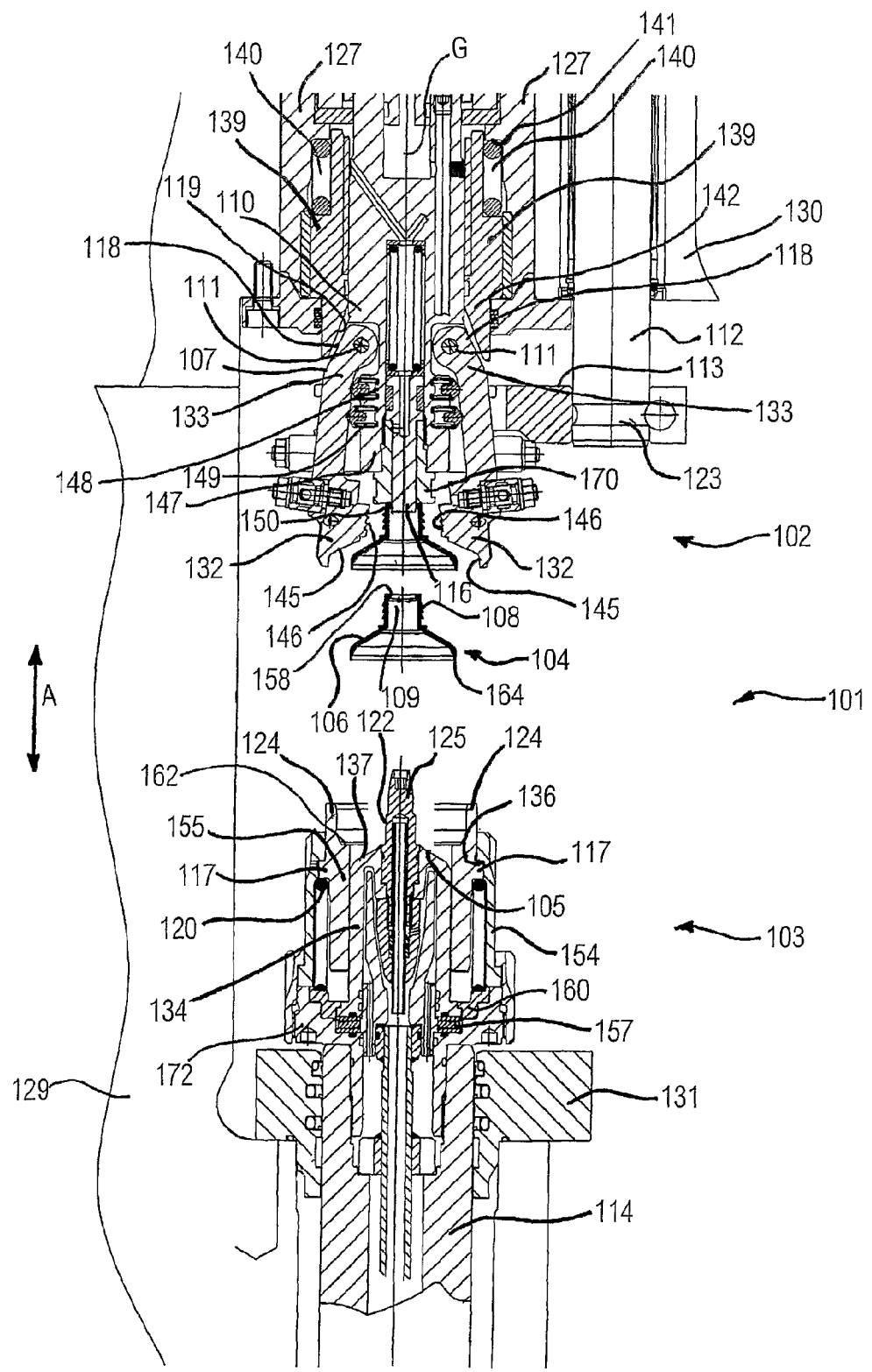
FIG. 11 is a section like the one in FIG. 9, showing the extraction of the formed object from the mould.
Figure 12:
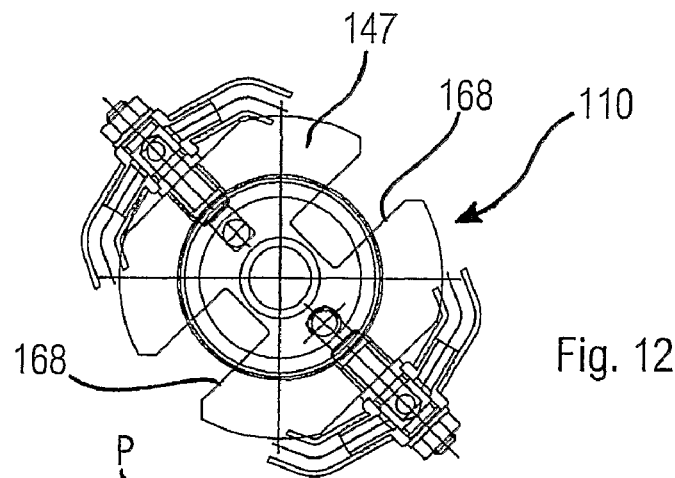
FIG. 12 is a plan view of a support element of the mould in FIG. 8.

Subsequently, the mould 101 closes to form the dose 135 so as to obtain a head 104 comprising a substantially frustum-conical side wall 106 and a threaded portion 108, which are shown in FIG. 11. The head 104 remains inside the closed mould 101 for sufficient time to ensure its forming, stabilisation and cooling. The mould 101 is then opened again to extract the finished head 104 and insert a new dose 135 to be formed.

The mould 101 comprises a forming arrangement provided with a first forming device 102 and a second forming device 103 suitable for interacting in a direction A to form the heads 104. The first forming device 102 comprises a die connected to a fork 113 (better shown in FIG. 14) fixed to a first end 123 of a column 112 that is slidable in the direction A inside a hollow support 130. Near a second end of the column 112 opposite the first end 123 a driving element 121 is fixed that is movable inside a cam guide 128 to drive the first forming device 102 in direction A.

The first forming device 102 comprises two movable elements 107 partially surrounded by the fork 113. Each movable element 107 is provided with a forming end 132 having a first forming surface 145 and a second forming surface 146. The first forming surfaces 145 are suitable for shaping the side wall 106 externally whereas the second forming surfaces 146 are suitable for shaping the threaded portion 108 of the head 104.

Figure 13:
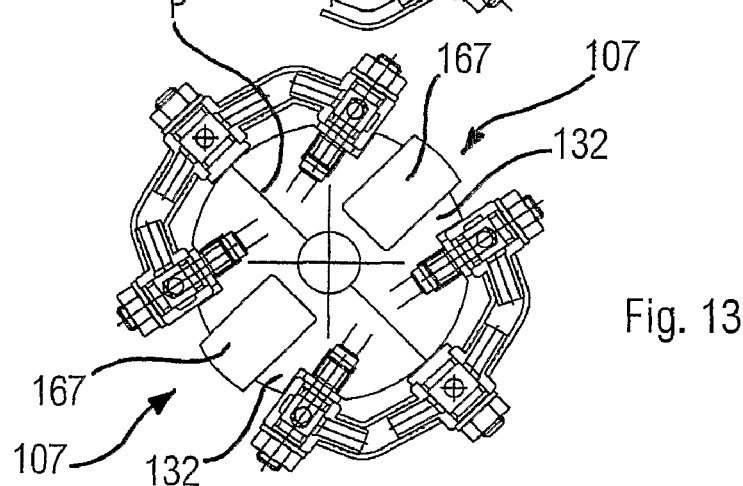
FIG. 13 is a plan view of two movable elements of the mould in FIG. 8.

As shown in FIG. 13, the forming ends 132 have a circular half-crown plan shape and are joined to one another along a contact plane P that is perpendicular to the plane of FIG. 13.

Each movable element 107 furthermore comprises a connecting end 133 opposite the forming end 132 and connected to it by an intermediate portion 167 provided with a substantially rectangular transverse section, as shown in FIG. 13.

Each connecting end 133 is rotatably connected by a hinge 111 to a support element 110 that is slidable in direction A inside a housing 127, as shown in FIG. 8. The connecting ends 133 are provided above with respective frustum-conical coupling surfaces 118 that are suitable for engaging in a shapingly coupled manner with a complementary coupling surface 119 obtained on a protruding end 142 of a locking sleeve 139, as shown in FIG. 11. The locking sleeve 139 extends around a longitudinal axis G parallel to the direction A, is movable in motion of translation in the direction A inside the housing 127 and is configured in such a way as to surround the support element 110, which is in turn slidable in relation to the locking sleeve 139. The support element 110 comprises a lower portion 147 provided with two diametrically opposite seats 168 and shown in FIG. 12. Each seat 168 receives a respective intermediate portion 167 of the corresponding movable element 107, as shown in FIG. 13. The lower portion 147 is furthermore peripherally provided with a groove 165 in which the two branches 166 of the fork 113 engage. In this way, the lower portion 147 is connected fixedly relative to the fork 113.

Figure 14:
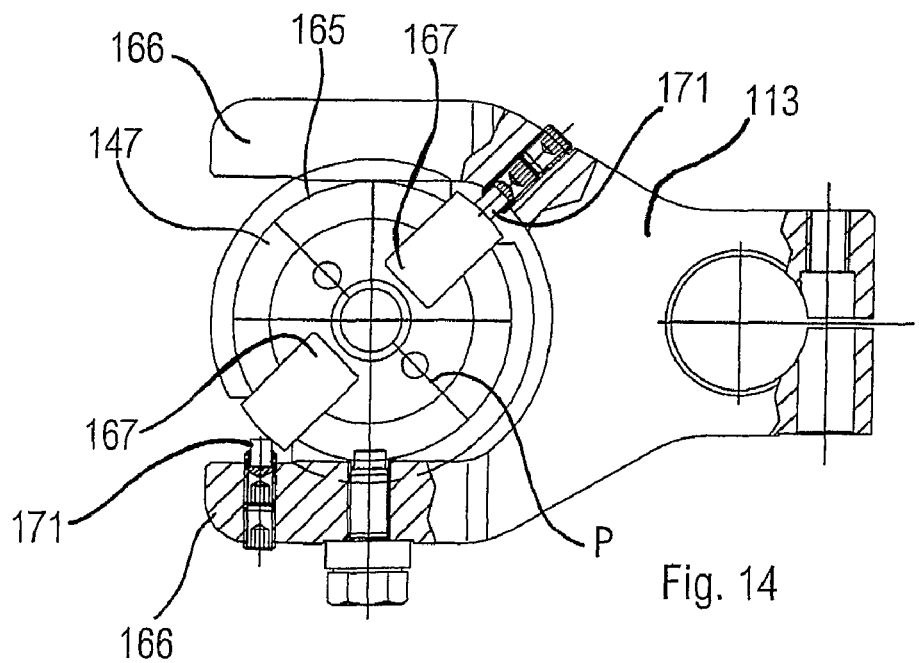
FIG. 14 is a plan view of the support element in FIG. 12 and of the movable elements of FIG. 13 assembled on a fork of the mould in FIG. 8.

Onto the lower portion 147 a bush 170 is screwed, which is shown in FIG. 11, which is provided below with a third forming surface 150 arranged transversely to the longitudinal axis G and is suitable for shaping an end surface 158 of the head 104. On the lower portion 147 a plurality of holes 148 is furthermore provided, shown in FIG. 11, arranged radially to the longitudinal axis G and hosting respective elastic retractors 149 that are suitable for acting on the movable elements 107 in such a way as to space them apart from one another by moving them from a contact position to a disengagement position. As shown in FIG. 14, with the intermediate portion 167 of each movable element 107 a respective stop element 171 is associated that is fitted to the fork 113 and is suitable for preventing the movable elements 107 from moving away from one another by an excessive amount. If this occurred, the retractors 149 could exit the holes 148. The stop elements 171 comprise threaded elements protruding inside the fork 113 by an adjustable amount.

Figure 9:
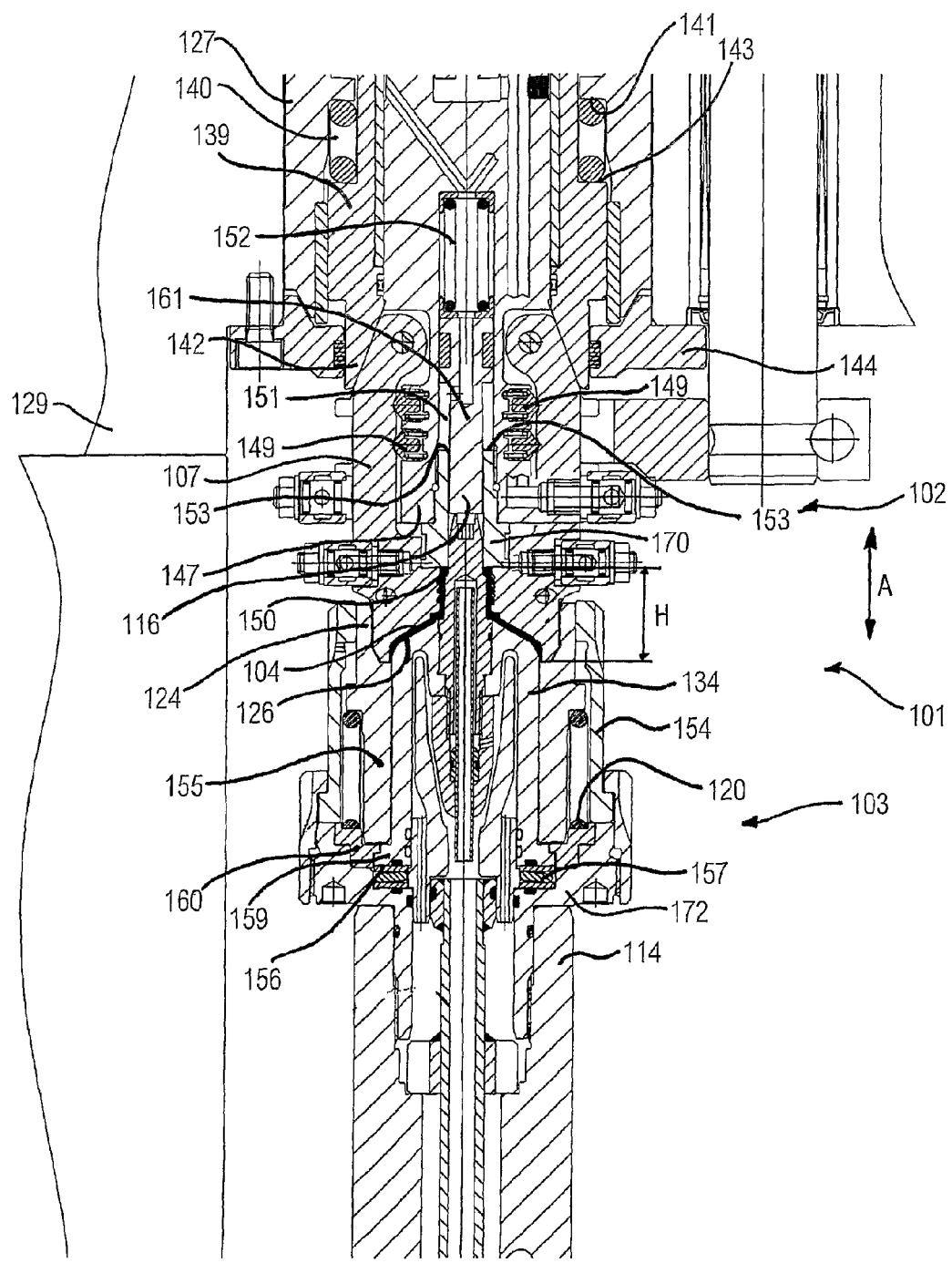
FIG. 9 is an enlarged and fragmentary section of the mould in FIG. 8 in a closing position.

Inside the lower portion 147 a blind hole 151 is obtained, shown in FIG. 9, that extends along the longitudinal axis G and inside which a centring element is housed comprising an elastic element 152 and a centring element 161 with a substantially cylindrical shape. The centring element 161 is provided with a protruding portion 116 suitable for engaging in an opening 109 of the head 104 and is movable in motion of translation inside the blind hole 151. An arrest edge 153 obtained on the bush 170 stops the stroke of the centring element 161 when, through the effect of the thrust exerted by the elastic element 152, the protruding portion 116 exits the blind hole 151 by a preset portion. The centring element 161 is distinct from the forming arrangement, i.e. it is not provided with forming surfaces suitable for shaping surfaces of the head 104.

A first spring 140 is interposed between a first projection 141, obtained on the housing 127, and a second projection 143, obtained on the locking sleeve 139. The first spring 140 exerts a force parallel to the direction A, in such a way as to push the second projection 143 towards an arrest element 144 fixed to the carousel 129, partially projecting the protruding end 142 outside the housing 127.

As shown in FIG. 8, with the first forming device 102 a second spring 190 and a third spring 191 of Belleville type are furthermore associated that have progressively increasing stiffness and are suitable for being compressed when the second forming device 103 comes into contact with the first forming device 102 and exerts on the latter force directed upwards.

Figure 10:
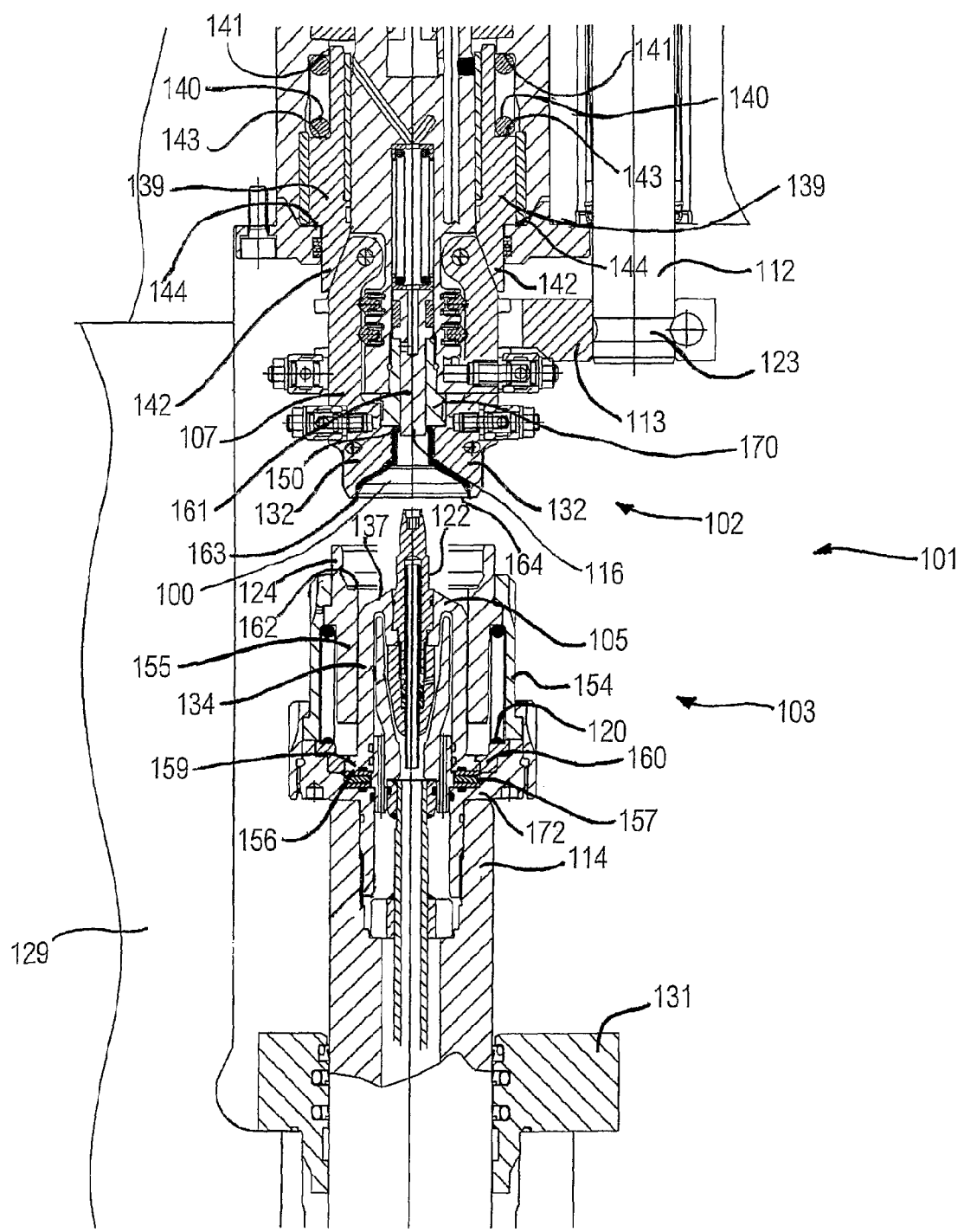
FIG. 10 is a section like the one in FIG. 9 showing the mould in an intermediate position.

The second forming device 103 comprises a punch 134 and is driven by a piston 114 slidable in the direction A inside a cylindrical support 131 fixed to the carousel 129, as shown in FIG. 10. To an upper end of the piston 114 a further housing 154 is fixed inside which a further sleeve 155 is slideably received that is provided with a circumferal projection 117 shown in FIG. 11. A further spring 120 pushes the circumferal projection 117 against an arrest edge 136 obtained inside the further housing 154 in such a way as to project a containing wall 124 obtained at an end of the further sleeve 155 outside the further housing 154. Inside the further sleeve 155 the punch 134 is furthermore arranged that is associated with the piston 114. By protruding outside the further housing 154, the containing wall 124 performs a dual function. Firstly, it enables the forming end 132 to be centred in relation to the punch 134 when the second forming device 103 approaches the first forming device 102. Secondly, the containing wall 124 defines, together with the punch 134, a cavity inside which the dose 135 can be received.

As shown in FIG. 10, the further sleeve 155 is provided with a fourth forming surface 162 that is suitable for shaping a further end surface 164 of the head 104, opposite the end surface 158.

The punch 134, the first and second forming surfaces 145 and 146 obtained on the movable elements 107, the third forming surface 150 of the bush 170 and the fourth forming surface 162 define in the closing position shown in FIG. 9 a chamber 126 inside which the dose 135 is formed. The punch 134 comprises, at its end that is near the piston 114, a flange 159 that is provided below with a rest surface 156.

An elastic member comprising for example a Belleville-type spring 157, interposed between the support surface 156 and a base 172 fixed to the piston 114, pushes the flange 159 against a stop ring 160. In this way, the punch 134 is kept in a position of maximum protrusion outside the housing 154.

The elastic member may also comprise a coiled spring, or a gas spring, or another elastic element in place of the Belleville-type spring 157.

The punch 134 is provided with an active end 105, suitable for cooperating with the first forming device 102, comprising a pointed portion 125 suitable for interacting with the protruding portion 116, a first active surface 137 and a second active surface 122 shown in FIG. 11. The first active surface 137 is suitable for internally shaping the side wall 106 of the head 104, whereas the second active surface 122 is suitable for internally shaping the threaded portion 108.

During operation, when the mould 101 is arranged in an opening position shown in FIG. 8, a dose 135 is introduced into the mould 101 to be received on the pointed portion 125. If instead of the ring-shaped dose 135 one or more compact doses were used, they could be positioned on the sides of the pointed portion 125. The movable elements 107 are arranged in a contact position in which they are brought near one another and the coupling surfaces 118 engage in a shapingly coupled manner with the complementary coupling surface 119.

The contact position of the movable elements 107 is reached when the column 112, moved by the driving element 121, brings the fork 113 and the support element 110 fixed relative to it near to the housing 127. The movable elements 107 assembled on the support element 110 are in turn partially introduced into the locking sleeve 139 until they interact with the protruding end 142. At this point the coupling surfaces 118 engage with the complementary coupling surfaces 119, opposing the action of the elastic retractors 149 in such a way as to place the movable elements 107 next to one another and to the lower portion 147. In this position the forming ends 132 are in contact with one another and define a forming recess 100.

When the dose 135 has been introduced into the mould 101, the piston 114 drives the second forming device 103 towards the first forming device 102, in the direction A. The further sleeve 155 approaches the movable elements 107 until the fourth forming surface 162 is brought into contact with a stop surface 163 provided on the forming ends 132 and shown in FIG. 10.

In this position, the stop surface 163 and the fourth forming surface 162 define a closing plane of the mould 101. In this way a maximum longitudinal dimension H of the chamber 126 is thus defined in the direction A, as shown in FIG. 9. The maximum longitudinal dimension H is kept constant during the forming, stabilisation and cooling phases, as will be better disclosed below.

Subsequently, the forming ends 132 push the further sleeve 155 inside the further housing 154, which further sleeve 155 approaches the stop ring 160, compressing the further spring 120.

Furthermore, the second forming device 103 pushes upwards the first forming device 102, compressing in order the first spring 140, the second spring 190 and the third spring 191. During this movement, the protruding ends 142 of the locking sleeve 139 penetrate inside the housing 127. The closing position shown in FIG. 9 is thus reached.

In this position the punch 134, pushed by the piston 114, engages in the forming recess 100, shaping the dose 135. In the meantime, the pointed portion 125 comes into contact with the protruding portion 116 and pushes the centring element 161 inside the blind hole 151 against the force of the elastic element 152. In particular, the pointed portion 125 is received inside the bush 170, going beyond the third forming surface 150.

In the closing position in FIG. 9, the punch 134 acts as a forming and compensating device, being free to move in relation to the first forming device 102 and to the further sleeve 155 to define a chamber 126 having a volume that is variable according to the weight of the dose 135.

In particular, if into the mould 101 a dose 135 is introduced having a greater weight than the nominal weight, the punch 134, under the thrust of the plastics, moves away from the first forming device 102, increasing the volume of the chamber 126. In order to do so, the punch 134 recedes inside the further housing 154, opposing the Belleville-type spring 157.

If, on the other hand, a relatively small dose is introduced, the punch 134 is pushed inside the housing 154 by a reduced amount, diminishing the volume of the chamber 126.

In other words, the position of the punch 134 in relation to the first forming device 102, i.e. the distance between the first active surface 137 and the first forming surface 145, varies according to the weight of the dose 135. On the other hand, the maximum longitudinal dimension H of the chamber 126 is kept constant, being determined by the relative position of the third forming surface 150 and of the fourth forming surface 162, which remains unvaried because the further sleeve 155, the movable elements 107 and the support element 110 act in this phase as a single body.

In this way, heads 104 are obtained having a constant height and a side wall 106 thickness that is variable according to the weight of the dose 135.

The dose 135, which is shaped in such a way as to form the head 104, remains inside the chamber 126 for the time necessary for the stabilisation and the cooling of the head 104. During this phase, the first forming device 102 and the second forming device 103 are cooled by a refrigerant fluid circulating inside suitable passage conduits obtained in the mould 101.

Subsequently, by means of the piston 114 the second forming device 103 is disengaged and moved away from the first forming device 102, which continues to support the head 104 owing to the undercuts of the threaded portion 108. Whilst the second forming device 103 moves away from the first forming device 102, the pointed portion 125 exits the blind hole 151, making the centring element 161 protrude outside under the thrust of the elastic element 152 and be centred in the opening 109 of the head 104, as shown in FIG. 10.

For this purpose, the centring element 161 is provided with a diameter that is slightly less than the diameter of the pointed portion 125. This enables the centring element 161 to enter inside the opening 109 although the diameter of the opening 109 diminishes due to the shrinkages that occur in the instants following moulding.

Subsequently, the driving element 121 and the cam guide 128 drive the fork 113 in the direction A away from the arrest element 144 in such a way as to disengage the movable elements 107 from the locking sleeve 139. The movable elements 107, pushed by the elastic retractors 149, move away from one another in such a way as to disengage the forming ends 132 from the head 104. In particular, the movable elements 107 describe an arched trajectory having a component parallel to the direction A.

As shown in FIG. 11, when the movable elements 107 move away from one another, the head 104 is initially supported by the centring element 161 and subsequently falls through gravity onto a collecting zone that is not shown from which it is removed by known means. The centring element 161 ensures that the head 104 falls in a controlled manner and is arranged in the collecting zone with the opening 109 facing upwards without taking on undesired positions. Furthermore, the centring element 161 enables it to be prevented that the head 104 remains attached to a movable element 107 when the movable elements 107 move away from one another.

At this point the mould 101 is ready for a new forming cycle.

In an embodiment that is not shown of the apparatus disclosed above, it is possible to provide a mould in which, in the closing position, the punch is fixed and the movable elements, the further sleeve and the support element can move fixed relative to one another to perform the compensating action. Furthermore, to take the mould to the closing position, it is also possible to move the first forming device by bringing it near to the punch or simultaneously move both the punch and the first forming device.

Lastly, the direction A can be vertical, as shown in FIGS. 8 to 11, but also horizontal or tilted.

With reference to FIGS. 15 to 18, there is shown a mould 201 of an apparatus for forming heads 204 of tubes by compression-moulding of plastics, the mould 201 comprising a forming arrangement provided with a first forming device 202 and second forming device 203 suitable for interacting in a direction A. The apparatus may comprise a plurality of moulds 201, arranged peripherally on a rotatable carousel 229, as disclosed previously with reference to FIGS. 1 to 4.

The mould 201 differs from the mould 101 shown in FIGS. 8 to 14 by the ways of varying the volume of the chamber in which the plastics are formed according to the weight of plastics to be formed. The differences between the two types of mould will be highlighted below, without again disclosing the parts that they have in common.

Figure 17:
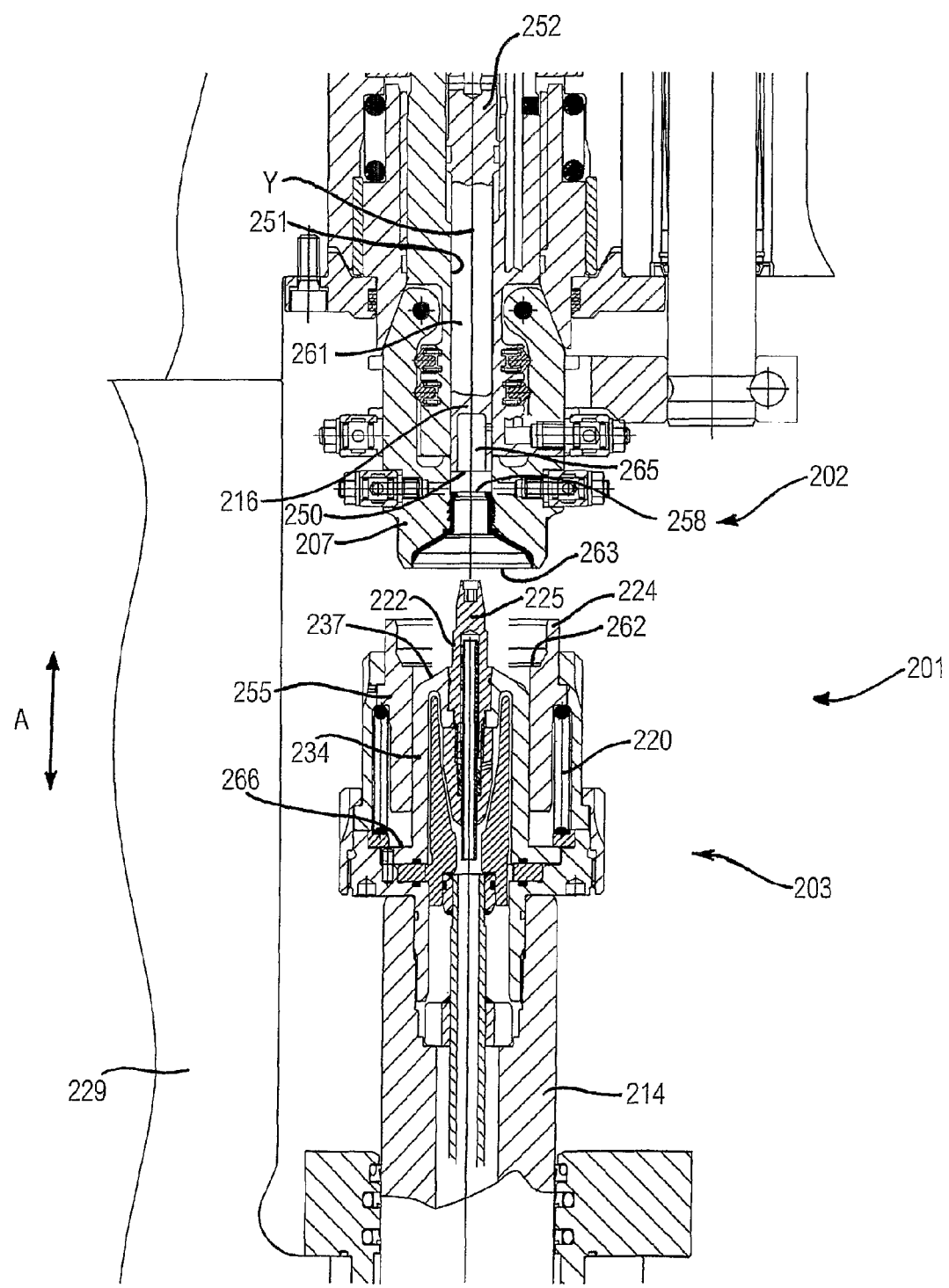
FIG. 17 is a section like the one in FIG. 16 showing the mould in an intermediate position.
Figure 18:
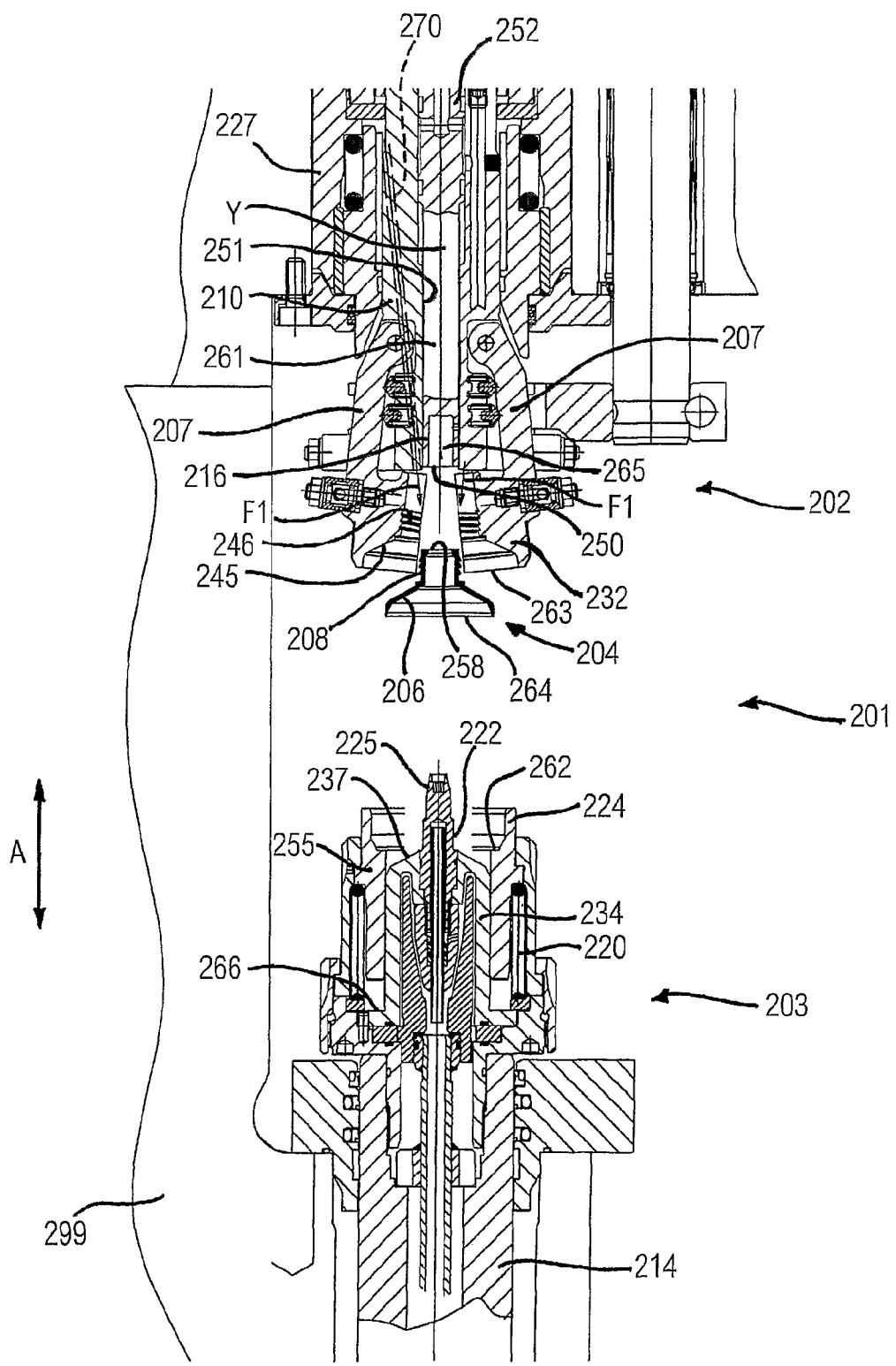
FIG. 18 is a section like the one in FIG. 16, showing the extraction of the formed object from the mould.

As shown in FIG. 18, the first forming device 202 comprises two movable elements 207 having respective forming ends 232 that are each provided with a first forming surface 245 and with a second forming surface 246 that are respectively suitable for shaping the external surface of a side wall 206 and of a threaded portion 208 of the head 204. The movable elements 207 are supported by a support element 210 inside which a through hole 251 is obtained that extends along a longitudinal axis Y parallel to the direction A. Inside the through hole 251 a forming stem 261 is housed that is provided with a compensating end 216 facing the second forming device 203 and with a fixing end 252 connected to a housing 227. On the compensating end 216 an active surface 250 is obtained that is arranged transversely in relation to the longitudinal axis Y and is suitable for forming an end surface 258 of the head 204, as shown in FIGS. 17 and 18.

The second forming device 203 comprises a punch 234 fixed relative to a piston 214 that enables the punch 234 to be moved in the direction A. The punch 234 comprises a first forming portion 237, suitable for internally shaping the side wall 206 of the head 204 and a second forming portion 222, suitable for internally shaping the threaded portion 208 of the head 204. From the second forming portion 222 a pointed portion 225 extends that is suitable for engaging in the indentation 265.

The punch 234 is arranged inside a sleeve 255 provided above with a further forming surface 262 suitable for forming a further end surface 264, opposite the end surface 258 of the head 204. On the sleeve 255 a containing wall 224 is obtained that is suitable for interacting with the forming ends 232, which extends upwards outside the further forming surface 262.

Figure 15:
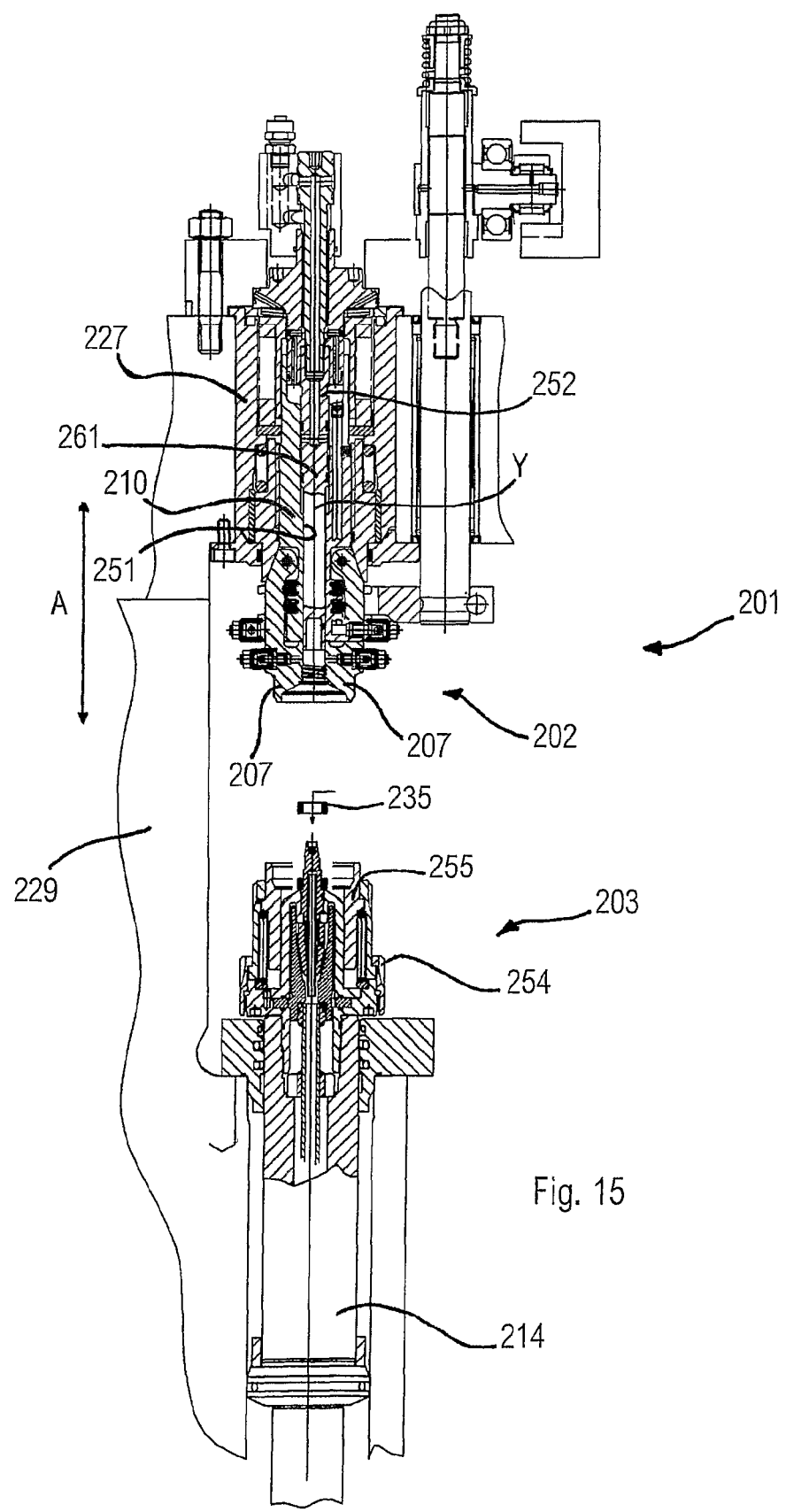
FIG. 15 is a partially sectioned side view of a portion of an alternative embodiment of the apparatus in FIG. 8, showing a mould in the opening position.

During operation, a dose 235 of plastics is introduced into the mould 201 arranged in an opening position, as shown in FIG. 15. Subsequently, the mould 201 goes to a closing position, shown in FIG. 16, in which the first forming device 202 interacts with the second forming device 203. The modes of passage from the opening position to the closing position of the mould 201 are substantially the same as previously disclosed with reference to FIGS. 8 and 9.

In the closing position, the movable elements 207 engage with the sleeve 255, having their stop surface 263 in contact with the further forming surface 262. The sleeve 255, pushed by the movable elements 207, is in contact with a stop surface 266 obtained on the punch 234, overcoming the force exerted by a preloaded spring 220.

Figure 16:
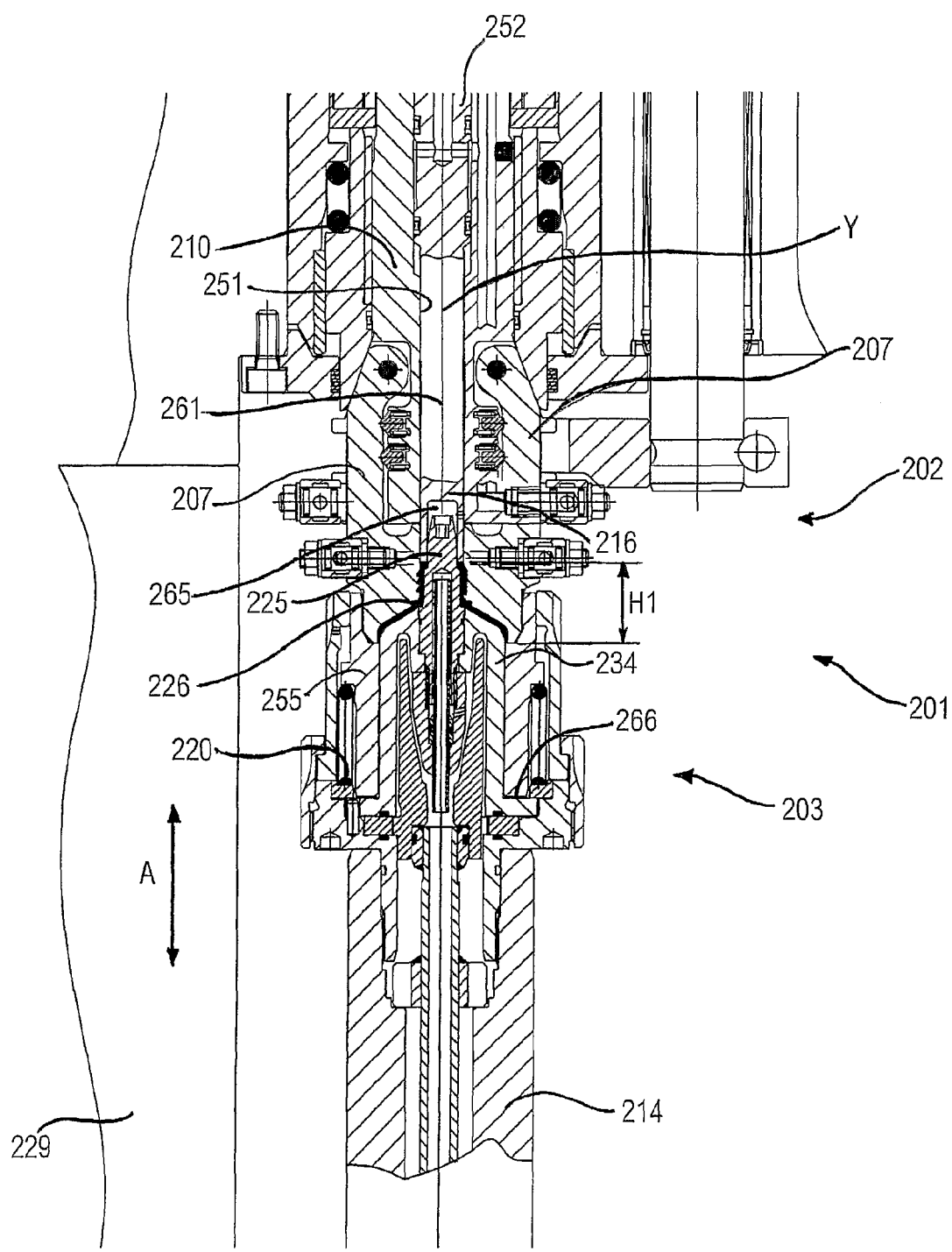
FIG. 16 is an enlarged and fragmentary section of the mould in FIG. 15 in a closing position.

In this position, the sleeve 255, the punch 234 and the movable elements 207 act as a single body that interacts with the forming stem 261 to define a chamber 226 inside which the dose 235 is shaped. This chamber is provided with a maximum longitudinal dimension H1 parallel to the direction A, as shown in FIG. 16.

In particular, the sleeve 255, the punch 234 and the movable elements 207 can move fixed relative to one another so that the pointed portion 225 approaches the forming stem 261 penetrating inside the indentation 265. Whilst this occurs, the distance between the further forming surface 262 and the active surface 250 of the forming stem 261 progressively decreases, i.e. the maximum longitudinal dimension H1 of the chamber 226 progressively decreases.

The degree of penetration of the pointed portion 225 inside the indentation 265 depends on the weight of the dose 235 introduced into the mould 201. In fact, if a dose having a relatively great weight has to be formed, a limited length of the pointed portion 225 engages in the indentation 265, to form a head having a maximum longitudinal dimension H1 that is the same as a first value. If, on the other hand, the dose to be formed has a relatively small weight, the pointed portion 225 penetrates more into the indentation 265. In this way a head is obtained having a maximum longitudinal dimension H1 the same as a second value that is less in relation to the first value cited above.

Nevertheless, in the closing position, the distance between the first forming surfaces 245 and the first forming portion 237 remains substantially constant, which enables heads 204 to be obtained having a side wall 206 with a constant thickness.

In other words, the punch 234, the sleeve 255 and the movable elements 207 act as forming and compensator device that define, together with the forming stem 261, a chamber 226 with a volume that is variable with the varying of the weight of the dose 235.

The head 204 remains inside the cavity 226 for the time required for stabilisation and cooling. Subsequently, the second forming device 203 disengages from the first forming device 202 whereas the movable elements 207 continue to support the head 204 engaging with the threaded portion 208, as shown in FIG. 17.

Subsequently, the movable elements 207 are driven in such a way as to move away from one another along an arched trajectory having a component parallel to the direction A, as shown in FIG. 18. The head 204 thus detaches from the first forming device 202 and falls into a collecting zone from which it is subsequently removed in the known manner. A pair of conduits 270 obtained inside the support element 210 enable respective jets of pressurised air to be sent to diametrically opposite portions of the head 104, as shown by the arrows F1. This enables a more uniform detachment of the head 104 from the movable elements 107 to be obtained.

The mould 201 is now ready for a new forming cycle.

In an embodiment that is not shown, the volume of the cavity can be modified according to the weight of the dose by moving the forming stem in relation to the assembly comprising the sleeve, the punch and the movable elements, which are kept in a fixed position.

Furthermore, to take the mould to the closing position, it is also possible to move the first forming device by bringing it near to the punch, or simultaneously moving both the punch and the first forming device.

Lastly, the direction A may be vertical as shown in FIGS. 15 to 18, but also horizontal or tilted.

Figure 19:
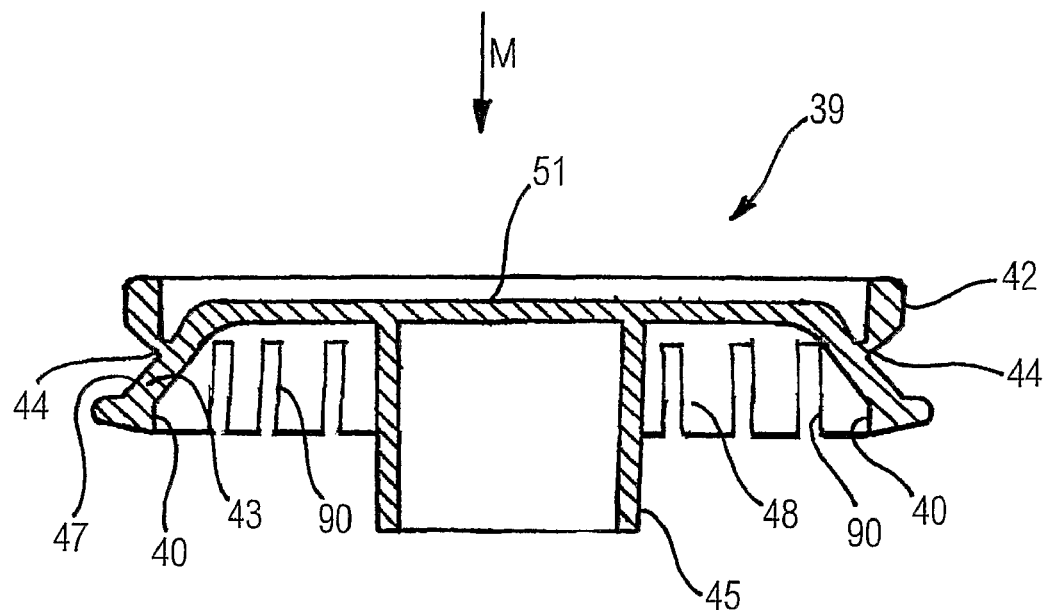
FIG. 19 is a schematic section of a cap for bottles, in particular for bottles of champagne, in a forming configuration.
Figure 20:
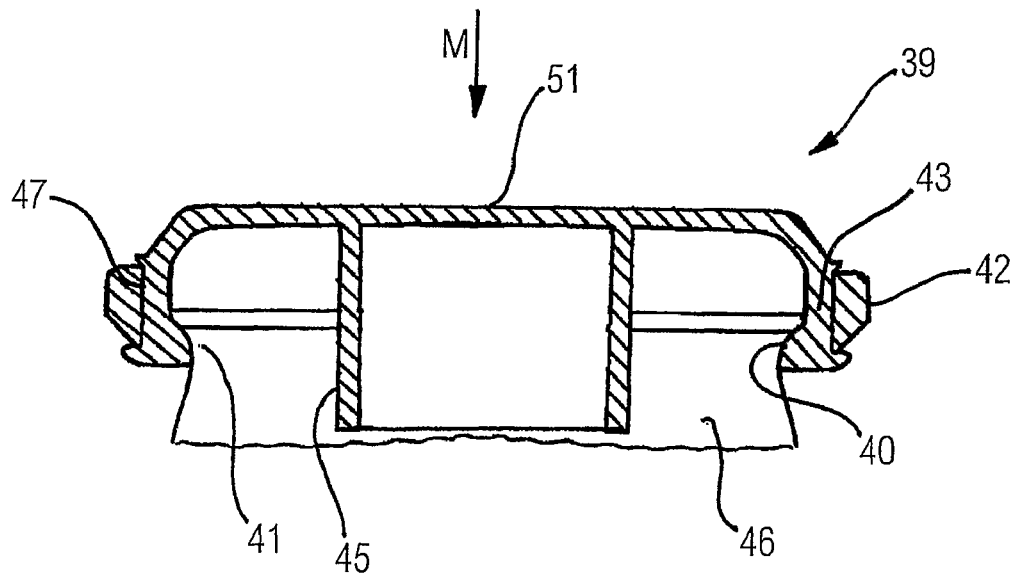
FIG. 20 is a section like the one in FIG. 19, showing the cap in a use configuration on a bottle.

With reference to FIGS. 19 and 20, there is shown a cap 39 for closing bottles 46 that in particular contain sparkling wine or champagne, inside which very high pressure is generated. The cap 39 comprises a closing body 48 provided with a transverse wall 51 from which a side wall 43 extends that assumes a substantially cylindrical configuration when the cap 39 is applied to a bottle 46, as shown in FIG. 20. The side wall 43 is provided with a plurality of notches 90 and is delimited below by a retaining edge 40, suitable for engaging with an edge portion 41 of the bottle 46. A tamperproof ring 42 is initially connected to the side wall 43 by bridge elements 44, as shown in FIG. 19. From the transverse wall 51 a cylindrical portion 45 furthermore extends that is suitable for being introduced into the bottle 46.

When the cap 39 is used, the cylindrical portion 45 is introduced into the bottle 46 whereas the tamperproof ring 42 is pushed in the direction indicated by the arrow M in such a way as to break the bridge elements 44. The tamperproof ring 42 is forced to engage in a circumferal seat 47 obtained on an external surface of the side wall 43, such as to flex said wall and keep it firmly in contact with the edge portion 41 of the bottle 46, as shown in FIG. 20. In this way the tamperproof ring 42 ensures that the closing body 48 remains engaged in the edge portion 41 of the bottle 46 even in the presence of particularly high pressure inside the bottle 46

With reference to FIGS. 21 to 26, there is shown a mould 301 of an apparatus for forming caps 39 of the type shown in FIG. 19 by compression-moulding of plastics, the mould 301 comprising a forming arrangement provided with a first forming device 302 and second forming device 303 suitable for interacting in a direction A. The apparatus, in a similar manner to what has been disclosed above with reference to FIGS. 1 to 4, may comprise a plurality of moulds 301 arranged peripherally on a rotatable carousel 329.

The mould 301 differs from the mould 101 shown in FIGS. 8 to 14 and from the mould 201 shown in FIGS. 15 to 18 because of certain structural elements and operating ways that will be highlighted below whereas the similarities with the previously disclosed moulds will not be disclosed in detail.

Figure 25:
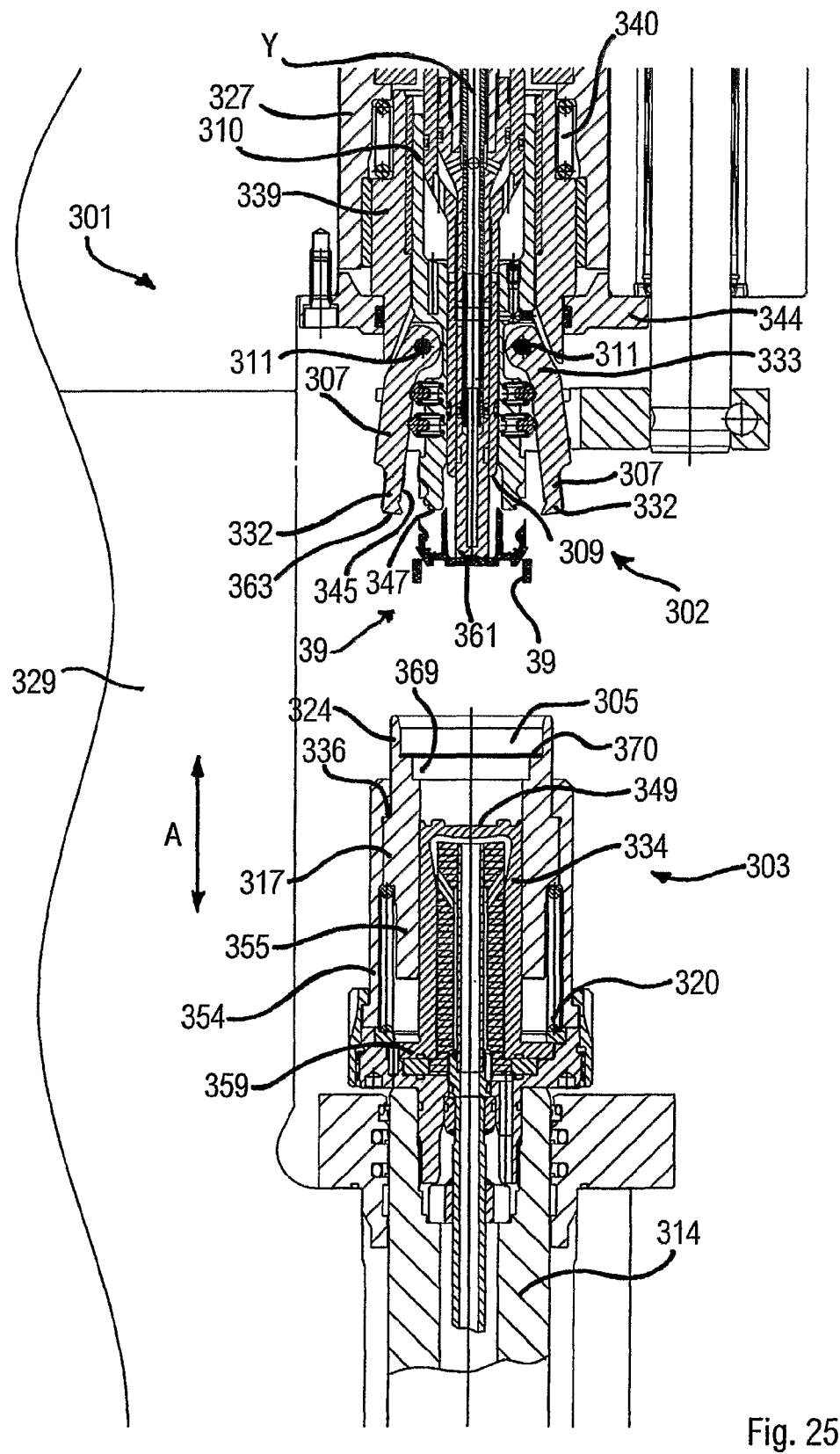
FIG. 25 is a section like the one in FIG. 22 showing a phase of extraction of the cap from the mould.

As shown in FIG. 25, the first forming device 302 comprises a pair of movable elements 307 having respective forming ends 332 each provided with a first forming surface 345 suitable for externally shaping the side wall 43 of the cap 39 and with a stop surface 363 suitable for engaging with the second forming device 303. The movable elements 307 are supported by an internally hollow support element 310 that extends along a longitudinal axis Y parallel to the direction A.

The movable elements 307 are furthermore provided with respective connecting ends 333 opposite the forming ends 332 and hinged on the support element 310 by respective hinges 311. The movable elements 307 can be moved in a manner that is very similar to what was disclosed with reference to FIGS. 8 to 14 between a contact position in which the forming ends 332 are in contact with one another and a disengagement position in which the forming ends 332 open to enable a cap 39 to be extracted from the mould 301. Driving elements 321, shown in FIG. 21 are also provided that are completely similar to the driving elements 121 shown in FIG. 8 and are arranged to move in motion of translation the support element 310 and the movable elements 307 that are connected to it in the direction A when the first forming device 302 does not interact with the second forming device 303.

The support element 310 is provided below with a shaped end 347 arranged to cooperate with the first forming surfaces 345 for internally forming the side wall 43 of the cap 39.

The support element 310 is movable in motion of translation inside a locking sleeve 339 in turn fitted in a housing 327 fixed to the carousel 329. Between the locking sleeve 339 and the housing 327 a first spring 340 is provided that keeps the locking sleeve 339 in contact below with an arrest element 344 that is connected to the carousel 329.

Figure 21:
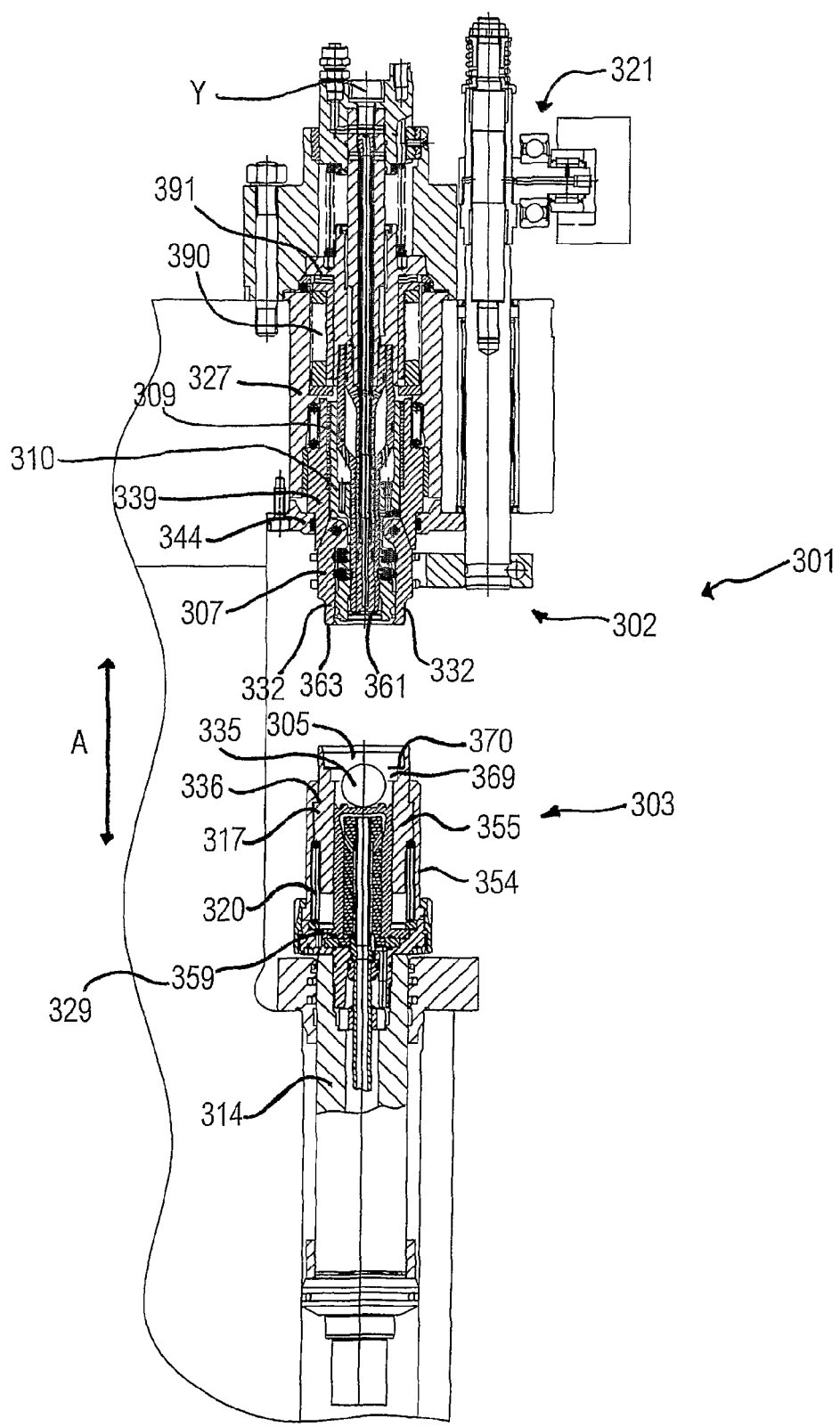
FIG. 21 is a section of a portion of an apparatus provided with a mould for producing caps of the type shown in FIG. 19.

As shown in FIG. 21, with the first forming device 302 there is furthermore associated a second spring 390 and a third spring 391 of the Belleville type, having progressively increasing stiffness and which are suitable for being compressed when the second forming device 303 comes into contact with the first forming device 302 and exerts on it a force directed upwards in the direction A.

Figure 26:
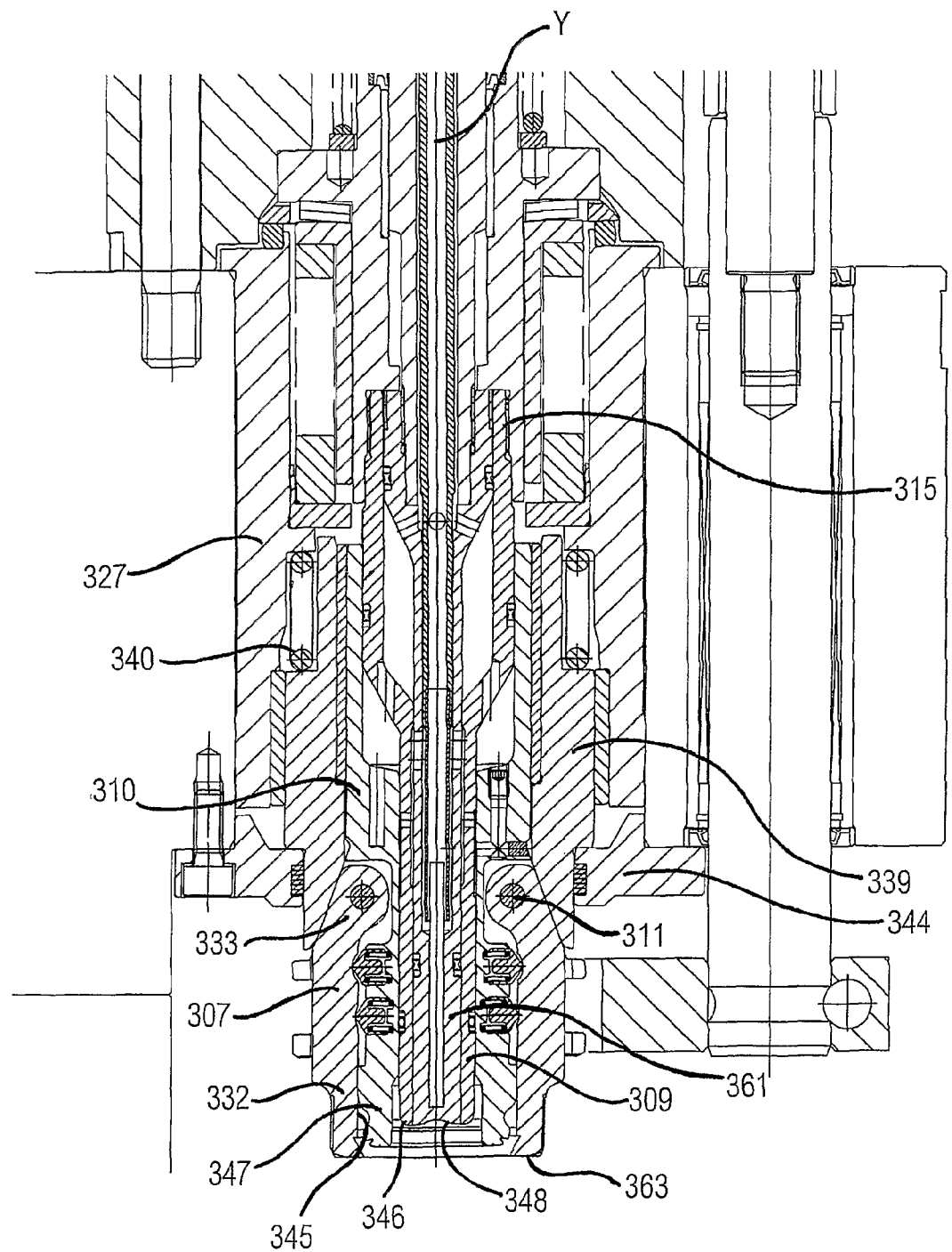
FIG. 26 is an enlarged section of an upper portion of the mould in FIG. 21.

Inside the support element 310 there is provided a tubular element 309 made fixed relative to the housing 327 by a threaded portion 315, as shown in FIG. 26. The tubular element 309 is provided below with a second forming surface 346 that can interact with the shaped end 347 of the support element 310 to form the cylindrical portion 45 of the cap 39.

The tubular element 309 accommodates an ejector 361 having a substantially cylindrical shape and extending along the longitudinal axis Y. The ejector 361 is movable in motion of translation in relation to the tubular element 309 owing to a driving arrangement that is not shown. At a lower end of the ejector 361 a third forming surface 348 is obtained that is suitable for internally shaping a portion of the transverse wall 51 of the cap 39.

The second forming device 303 comprises a forming member 334 provided above with a fourth forming surface 349 suitable for defining the transverse wall 51 of the cap 39. The forming member 334 is provided below with an attachment flange 359 connected to a piston 314 suitable for moving the second forming device 303 in the direction A.

A sleeve 355 that is coaxial with the forming member 334 and is arranged outside it is received in a further housing 354 fixed relative to the piston 314. From an upper end zone of the sleeve 355 a containing wall 324 extends that is suitable for receiving in a shapingly coupled manner the forming ends 332 in a closing position of the mould 301. The containing wall 324 is joined to the sleeve 355 at a further stop surface 370 arranged transversely in relation to the direction A to cooperate with the stop surfaces 363 obtained on the movable elements 307.

Inside the sleeve 355 and in the proximity of the containing wall 324 a shaped portion 369 is received that is suitable for interacting with the forming member 334 and with the forming ends 332 of the movable elements 307 to form the tamper-proof ring 42.

Between the sleeve 355 and the further housing 354 there is provided a further spring 320 that exerts a force that is parallel to the direction A projecting the sleeve 355 partially outside the further housing 354. In particular, the further spring 320 pushes a circumferal projection 317 obtained on the sleeve 355 against an arrest edge 336 provided inside the further housing 354.

During operation, the mould 301 is initially in an opening position shown in FIG. 21 in which the first forming device 302 is spaced away from the second forming device 303. The sleeve 355 is in its maximum excursion position in relation to the further housing 354 inasmuch as the further spring 320 pushes the circumferal projection 317 into contact with the arrest edge 336. The forming member 334 and the containing wall 324 of the sleeve 355 define a recess 305 into which a dose 335 of plastics is introduced. The movable elements 307 are in the contact position in which the forming ends 332 are in contact with one another. The driving elements 321 position the movable elements 307 in such a way that the stop surface 363 is significantly lower than the lower ends of the tubular element 309 and of the ejector 361.

Figure 22:
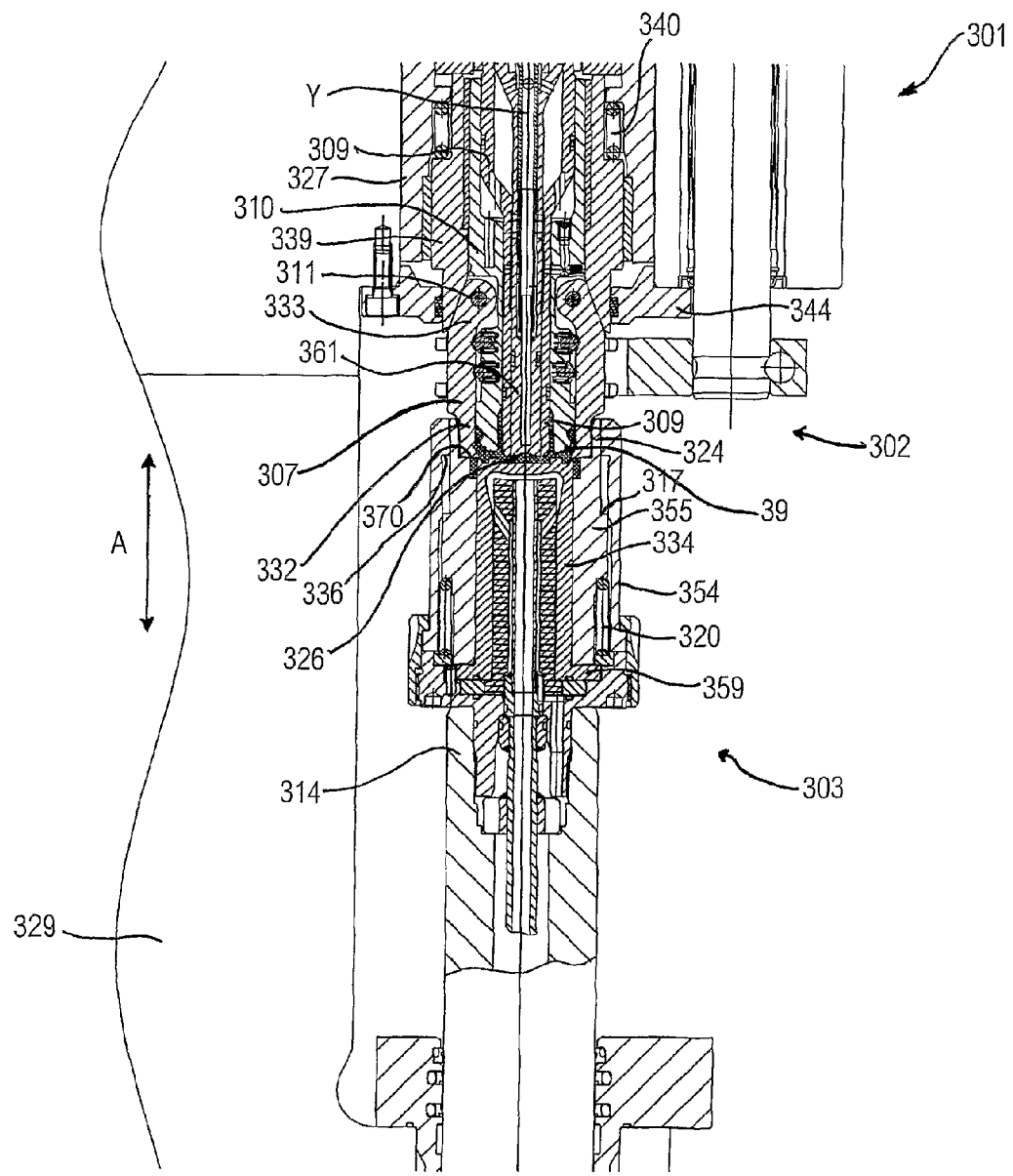
FIG. 22 is an enlarged and fragmentary section of the mould in FIG. 21 in a closing position.

Subsequently, the piston 314 drives the second forming device 303 bringing it near the first forming device 302 in the direction A, bringing the further stop surface 370 into contact with the stop surface 363, as shown in FIG. 22. Whilst the piston 314 continues to bring the further housing 354 near to the first forming device 302, the sleeve 355, the advance of which in the direction A is opposed by the movable elements 307, compresses the further spring 320 until it comes to rest against the attachment flange 359.

Under the thrust of the second forming device 303, the movable elements 307 move upwards, approaching the arrest element 344 in such a way as to substantially align the stop surface 363 on the lower ends of the ejector 361 and of the tubular element 309. The mould 301 is thus in the closing position in which between the first forming device 302 and the second forming device 303 a chamber 326 is defined inside which the dose 335 is shaped to obtain the cap 39.

Figure 23:
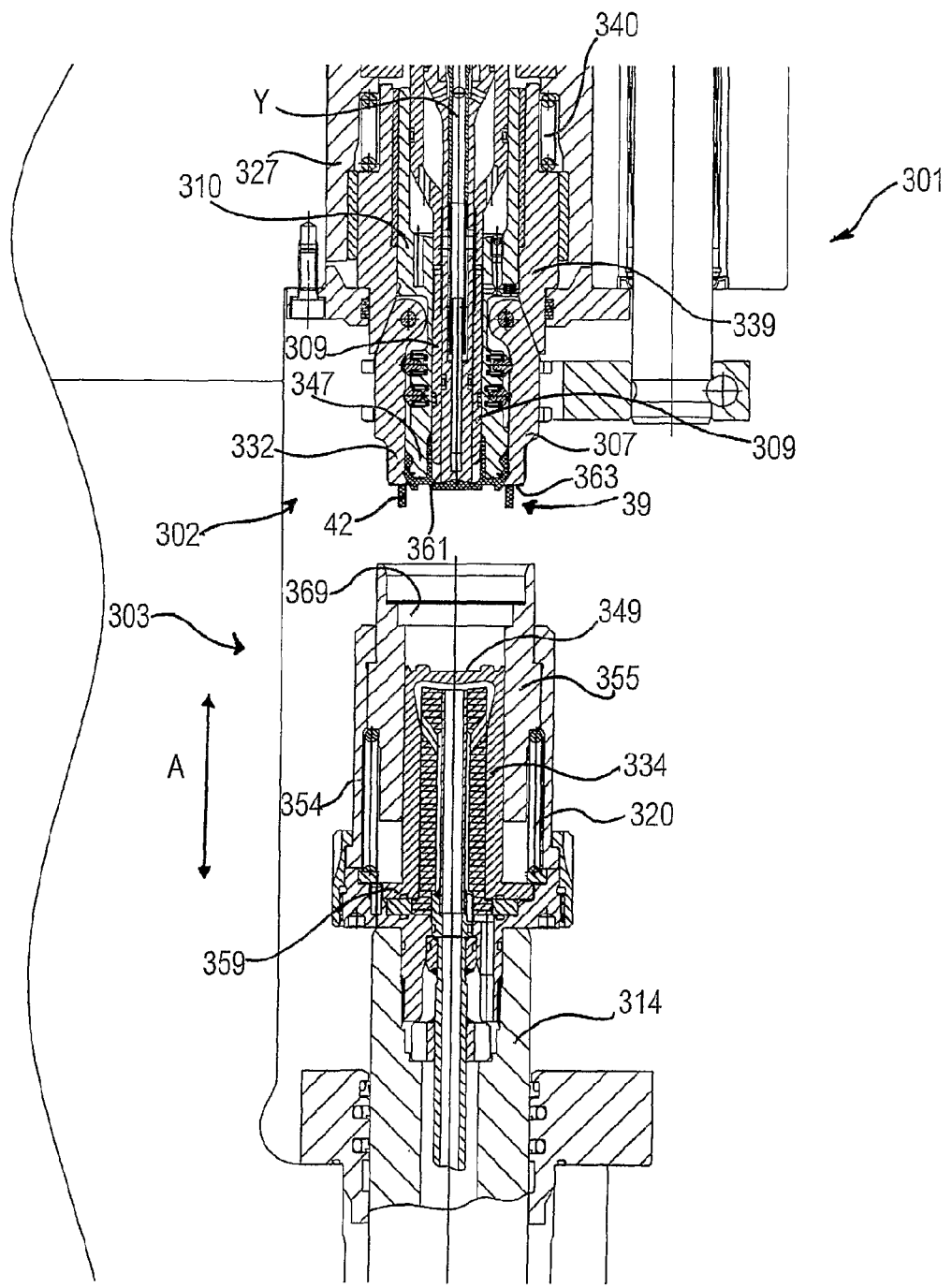
FIG. 23 is a section like the one in FIG. 22 showing the mould in an intermediate position.
Figure 24:
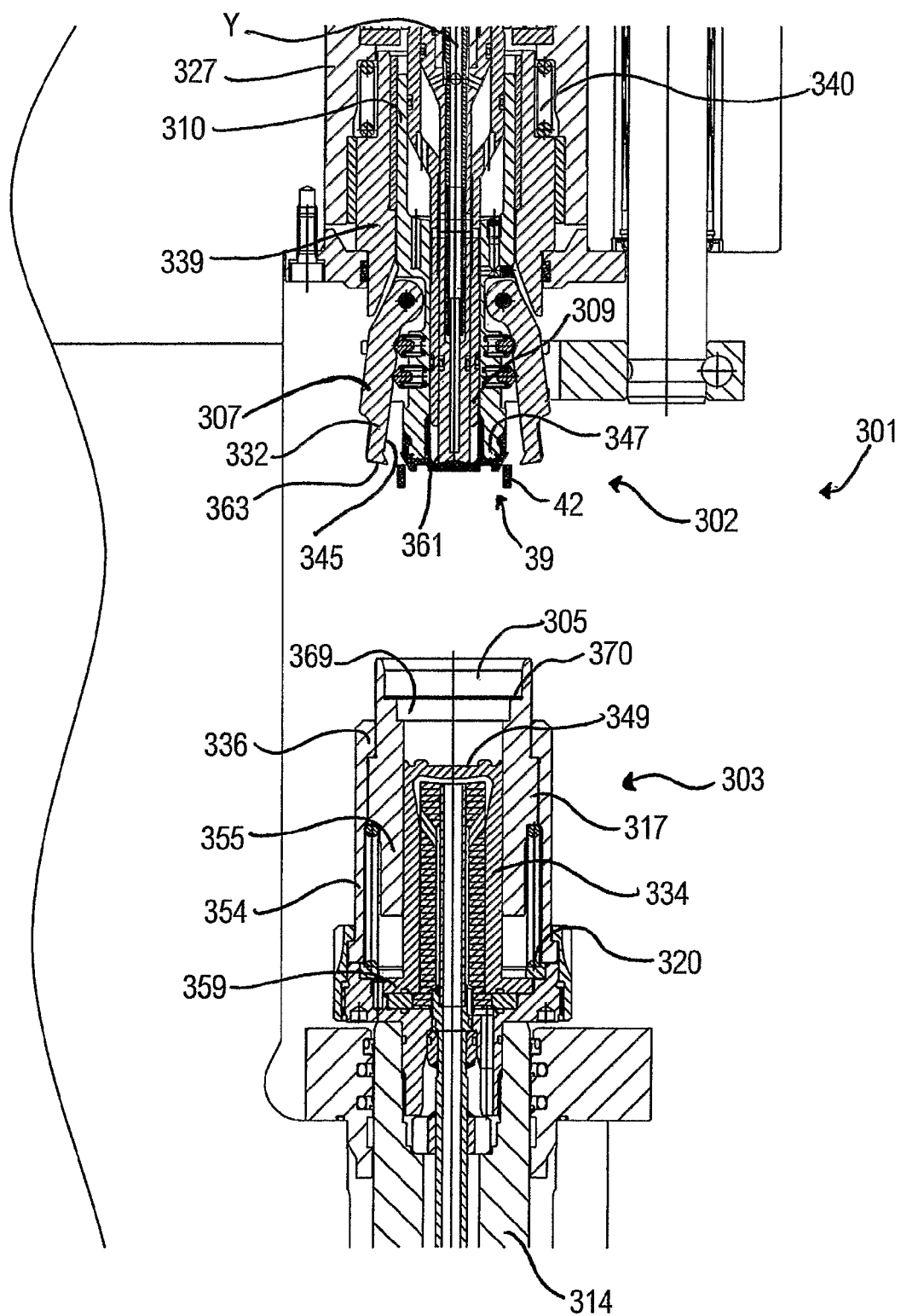
FIG. 24 is a section like the one in FIG. 22 showing the mould in an opening position.

When the cap 39 has remained in the chamber 326 for sufficient time to stabilise its shape and the temperature has fallen to an acceptable level, the piston 314 moves the second forming device 303 away from the first forming device 302, as shown in FIG. 23. The further spring 320 pushes the sleeve 355 upwards, which, as it is no longer retained by the movable elements 307, goes to rest against the arrest edge 336. Simultaneously, the driving element 321 moves the movable elements 307 away from the housing 327 and the driving arrangement brings the ejector 361 near to the second forming device 303. The tubular element 309, which is fixed relative to the housing 327, remains in a retracted position in relation to the movable elements 307 and to the ejector 361, partially disengaging from the cylindrical portion 45 of the cap 39, as shown in FIG. 24. The driving element 321 continues to move the movable elements 307 away from the housing 327, disengaging the connecting end 333 from the locking sleeve 339. At this point the movable elements 307 open and go to the disengagement position in FIG. 24, whilst the cap 39 remains associated with the first forming device 302. In fact, the side wall 43 is provided with internal undercuts that engage with the shaped end 347 of the support element 310.

Subsequently, the driving arrangement, which continues to move the ejector 361 towards the second forming device 303, elastically deforms the side wall 43 of the cap 39 disengaging it from the shaped end 347, as shown in FIG. 25. The cap 39 can now be extracted from the mould 301 and a new forming cycle can start.

The moulds disclosed up to now may operate not only according to compression-moulding techniques in which a dose of plastics is separated from an extruder and introduced into the mould, but also according to injection-moulding techniques in which a fluid plastic material is injected inside a closed mould.

The features disclosed in the disclosure of the Figures with reference to a specific embodiment may also be claimed in relation to any other embodiment disclosed or may also be claimed in their own right.

The invention claimed is:

1. Apparatus comprising a forming arrangement closable in a direction to form an object having an outer portion provided with an undercut, said forming arrangement comprising at least two elements each having a forming surface for shaping said outer portion, said at least two elements being movable relative to each other along respective arched trajectories to disengage from said outer portion after said object is formed, wherein said arched trajectories have respective components parallel to said direction, a cooling circuit for a refrigerant fluid being associated with said forming arrangement, said cooling circuit being configured to circulate said refrigerant fluid in said at least to elements.

2. Apparatus according to claim 1, wherein said arched trajectories are contained on respective planes parallel to said direction.

3. Apparatus according to claim 1, wherein said at least two elements are rotatable around respective axes along said arched trajectories.

4. Apparatus according to claim 1, and furthermore comprising a moving arrangement suitable for moving said at least two elements.

5. Apparatus according to claim 4, wherein said moving arrangement comprises elastic retractors arranged to move said at least two elements away from each other along said arched trajectories.

6. Apparatus according to claim 4, wherein said moving arrangement is assembled in a casing in which said forming arrangement is partially included.

7. Apparatus according to claim 6, wherein said at least two elements are arranged outside said casing in a position adjacent thereto.

8. Apparatus according to claim 6, wherein said moving arrangement comprises a plurality of columns extending inside said casing and exiting therefrom to support said at least two elements.

9. Apparatus according to claim 8, wherein the columns of said plurality of columns are slidable inside respective bushes parallel to said direction.

10. Apparatus according to claim 9, wherein said bushes are fixed relative to pivots assembled in a rotatable manner in respective seats.

11. Apparatus according to claim 10, and furthermore comprising levers exiting from said casing to drive said pivots in an oscillating manner in relation to said seats.

12. Apparatus according to claim 1, and furthermore comprising a locking member arranged to keep said at least two elements in a contact position in which said at least two elements are in contact with one another.

13. Apparatus according to claim 12, wherein said locking member is provided with first coupling surfaces suitable for engaging in a shapingly coupled manner with second coupling surfaces of said elements in said contact position.

14. Apparatus according to claim 13, wherein said first coupling surfaces and said second coupling surfaces comprise respectively first frustum-conical portions and second frustum-conical portions.

15. Apparatus according to claim 13, wherein said first coupling surfaces and said second coupling surfaces respectively comprise first cylindrical portions and second cylindrical portions.

16. Apparatus according to claim 12, wherein said at least two elements and said locking member are reciprocally movable to disengage said at least two elements from, and engage said at least two elements with, said locking member.

17. Apparatus according to claim 12, wherein said locking member is associated with ends of said at least two elements on which said forming surface is obtained.

18. Apparatus according to claim 12, wherein said locking member is associated with further ends of said at least two elements, said further ends being opposite ends of said at least two elements on which said forming surface is obtained.

19. Apparatus according to claim 12, and furthermore comprising an elastic retaining element acting on said at least two elements to maintain said at least two elements in said contact position.

20. Apparatus according to claim 1, and furthermore comprising a self-aligning device associated with said at least two elements to prevent misalignments between said at least two elements when said at least two elements move along said arched trajectories.

21. Apparatus according to claim 1, wherein said forming arrangement is positionable in a closed position in which it defines a chamber for forming said object.

22. Apparatus according to claim 21, wherein said chamber has a portion provided with a transverse dimension extending transversely to said direction and adjacent to a further portion of lesser transverse dimensions in relation to said transverse dimension.

23. Apparatus according to claim 22, wherein said forming arrangement comprises a first part, said at least two elements being positionable in relation to said first part in such a way that said portion is defined by adjacent zones of said at least two elements and of said first part.

24. Apparatus according to claim 23, wherein said portion is arranged to form on said object a protruding region protruding transversely to said direction in relation to further regions of said object adjacent to said protruding region.

25. Apparatus according to claim 24, wherein said protruding region comprises a collar that protrudes from said object.

26. Apparatus according to claim 23, wherein in said first part a recess is obtained that is suitable for forming an external surface of said object.

27. Apparatus according to claim 26, wherein said recess is arranged inside a casing in which said forming arrangement is partially included.

28. Apparatus according to claim 21, wherein said forming arrangement comprises a first forming device and a second forming device suitable for interacting in said closed position to define said chamber.

29. Apparatus according to claim 28, wherein said at least two elements are associated with said first forming device.

30. Apparatus according to claim 28, wherein said at least two elements are arranged in the same semispace defined by a contact plane along which said first forming device and said second forming device are in contact with one another in said closed position.

31. Apparatus according to claim 30, wherein with said second forming device at least two further reciprocally movable elements are associated to disengage from said object.

32. Apparatus according to claim 31, wherein said at least two further movable elements are arranged in a further semispace lying on an opposite side of said contact plane in relation to said semispace.

33. Apparatus according to claim 1, wherein said forming arrangement is arranged to operate according to an injection-moulding technology.

34. Apparatus according to claim 1, wherein said forming arrangement is arranged to operate according to a compression-moulding technology.

35. Apparatus according to claim 28, wherein said forming arrangement is arranged to operate according to a compression-moulding technology, and wherein said second forming device comprises a first member suitable for coming into contact with said first forming device and a second member, in said closed position said second member being movable in relation to said first forming device by an elastic member to vary the volume of said chamber according to the weight of a dose of plastics introduced into said chamber.

36. Apparatus according to claim 35, wherein said elastic member comprises a belleville-type spring.

37. Apparatus according to claim 35, wherein said elastic member is interposed between said second member and a support suitable for supporting said second member.

38. Apparatus according to claim 37, wherein with said support an actuating element is associated to move said second forming device in said direction.

39. Apparatus according to claim 35, wherein said elastic member is arranged in such a way as to exert on said second member a force directed in said direction.

40. Apparatus according to claim 35, wherein said first forming device is provided with a stop surface suitable for coming into contact, in said closed position, with a further stop surface obtained on said first member.

41. Apparatus according to claim 40, wherein said first forming device comprises a shaping surface suitable for obtaining on said object an end surface.

42. Apparatus according to claim 41, wherein said first member is provided with a further shaping surface suitable for obtaining on said object a further end surface opposite said end surface.

43. Apparatus according to claim 42, wherein said further shaping surface is adjacent to said further stop surface.

44. Apparatus according to claim 42, wherein, in said closed position, said shaping surface and said further shaping surface are placed at a distance corresponding to a maximum dimension of said object in said direction.

45. Apparatus according to claim 35, wherein said first forming device is provided with a first forming surface cooperating with an active surface of said second member to form a wall of said object extending transversely in relation to said direction.

46. Apparatus according to claim 35, wherein said second member comprises a punch suitable for forming an internal surface of said object.

47. Apparatus according to claim 46, wherein said first forming device comprises a die interacting with said punch.

48. Apparatus according to claim 47, wherein said die is partially defined by said at least two elements.

49. Apparatus according to claim 35, wherein said second member is slidable in said direction inside said first member.

50. Apparatus according to claim 21, wherein said forming arrangement is arranged to operate according to a compression-moulding technology.

51. Apparatus according to claim 50, wherein said forming arrangement comprises a shaping device and a forming and compensator device interacting with said shaping device in said direction to define in said closed position said chamber for forming a dose of plastics, said chamber having a maximum longitudinal dimension in said direction.

52. Apparatus according to claim 51, wherein said forming and compensator device is positionable in relation to said shaping device in such a way as to define a dimension of said chamber in said direction, different from said maximum longitudinal dimension, substantially independent of the weight of said dose.

53. Apparatus according to claim 52, wherein said forming and compensator device is movable in relation to said shaping device in said closed position.

54. Apparatus according to claim 53, wherein, in said closed position, said forming and compensator device is slidable in relation to said shaping device in said direction.

55. Apparatus according to claim 51, wherein said shaping device is provided with an active surface suitable for forming an end surface of said object.

56. Apparatus according to claim 55, wherein said active surface extends transversely in relation to said direction.

57. Apparatus according to claim 55, wherein said forming and compensator device is provided with a respective forming surface suitable for forming a further end surface of said object opposite said end surface.

58. Apparatus according to claim 57, wherein, in said closed position, said respective forming surface and said active surface are placed at a distance from one another that is the same as said maximum longitudinal dimension.

59. Apparatus according to claim 51, wherein said forming and compensator device comprises a punch suitable for forming an internal surface of said object.

60. Apparatus according to claim 55, wherein said forming and compensator device comprises a punch suitable for forming an internal surface of said object, said active surface defining an end region of a die cooperating with said punch to define said chamber.

61. Apparatus according to claim 60, wherein a side region of said die adjacent to said end region is defined by said forming and compensator device.

62. Apparatus according to claim 51, wherein said forming and compensator device comprises said at least two elements.

63. Apparatus according to claim 61, wherein said forming and compensator device comprise said at least two elements, said at least two elements defining said side region.

64. Apparatus according to claim 61, wherein said punch is provided with a forming portion interacting with said side region to form a wall of said object having said dimension.

65. Apparatus according to claim 1, and furthermore comprising a centring element suitable for engaging with said object to support said object when said forming arrangement disengages therefrom.

66. Apparatus according to claim 65, wherein said centring element comprises a protruding member exiting from a respective seat to engage in an opening of said object when said forming arrangement disengages therefrom.

67. Apparatus according to claim 66, wherein said protruding member comprises a stem extending in said direction.

68. Apparatus according to claim 66, wherein said protruding member is movable in said direction to engage in and disengage from said opening.

69. Apparatus according to claim 66, wherein with said protruding member there is associated an elastic element suitable for pushing said protruding member outside said respective seat.

70. Apparatus according to claim 69, wherein said elastic element exerts on said protruding member a force directed in said direction.

71. Apparatus according to claim 66, wherein said forming arrangement comprises a pointed portion suitable for engaging with said protruding member for pushing said protruding member inside said respective seat.

72. Apparatus according to claims 65, wherein said centring element is distinct from said forming arrangement.

73. Apparatus according to claim 1, wherein said direction is vertical.

74. Apparatus according to claim 1, wherein said direction is horizontal.

75. Apparatus according to claim 1, wherein said forming arrangement is assembled on a carousel that is rotatable around an axis parallel to said direction.

76. Apparatus according to claim 75, wherein with said carousel a plurality of said forming arrangements are associated that are angularly equally spaced apart along a peripheral region of said carousel.

77. Apparatus according to claim 1, wherein said forming arrangement is movable along a path that takes said forming arrangement to interact with a plurality of carousels.

78. Apparatus according to claim 1, wherein said forming arrangement is assembled on a movable shuttle.

79. Apparatus according to claim 1, and comprising a plurality of said forming arrangements positioned in a linear arrangement.

80. Apparatus comprising a forming arrangement arranged to operate according to a compression-moulding technology, said forming arrangement being closable in a direction and positionable in a closed position in which it defines a chamber for forming an object having an outer portion provided with an undercut, said forming arrangement comprising a first forming device and a second forming device suitable for interacting in said closed position to define said chamber, said forming arrangement comprising at least two elements each having a forming surface for shaping said outer portion, said at least two elements being associated with said first forming device, said at least two elements being movable relative to each other along respective arched trajectories to disengage from said outer portion after said object is formed, said arched trajectories having respective components parallel to said direction, said second forming device comprising a first member suitable for coming into contact with said first forming device and a second member, in said closed position said second member being movable in relation to said first forming device by an elastic member to vary the volume of said chamber according to the weight of a dose of plastics introduced into said chamber.

81. Apparatus according to claim 80, wherein said arched trajectories are contained on respective planes parallel to said direction.

82. Apparatus according to claim 80, wherein said at least two elements are rotatable around respective axes along said arched trajectories.

83. Apparatus according to claim 80, and furthermore comprising a moving arrangement suitable for moving said at least two elements.

84. Apparatus according to claim 83, wherein said moving arrangement comprises elastic retractors arranged to move said at least two elements away from each other along said arched trajectories.

85. Apparatus according to claim 83, wherein said moving arrangement is assembled in a casing in which said forming arrangement is partially included.

86. Apparatus according to claim 85, wherein said at least two elements are arranged outside said casing in a position adjacent thereto.

87. Apparatus according to claim 85, wherein said moving arrangement comprises a plurality of columns extending inside said casing and exiting therefrom to support said at least two elements.

88. Apparatus according to claim 87, wherein the columns of said plurality of columns are slidable inside respective bushes parallel to said direction.

89. Apparatus according to claim 88, wherein said bushes are fixed relative to pivots assembled in a rotatable manner in respective seats.

90. Apparatus according to claim 89, and furthermore comprising levers exiting from said casing to drive said pivots in an oscillating manner in relation to said seats.

91. Apparatus according to claim 80, and furthermore comprising a locking member arranged to keep said at least two elements in a contact position in which said at least two elements are in contact with one another.

92. Apparatus according to claim 91, wherein said locking member is provided with first coupling surfaces suitable for engaging in a shapingly coupled manner with second coupling surfaces of said elements in said contact position.

93. Apparatus according to claim 92, wherein said first coupling surfaces and said second coupling surfaces comprise respectively first frustum-conical portions and second frustum-conical portions.

94. Apparatus according to claim 92, wherein said first coupling surfaces and said second coupling surfaces respectively comprise first cylindrical portions and second cylindrical portions.

95. Apparatus according to claim 91, wherein said at least two elements and said locking member are reciprocally movable to disengage said at least two elements from, and engage said at least two elements with, said locking member.

96. Apparatus according to claim 91, wherein said locking member is associated with ends of said at least two elements on which said forming surface is obtained.

97. Apparatus according to claim 91, wherein said locking member is associated with further ends of said at least two elements, said further ends being opposite ends of said at least two elements on which said forming surface is obtained.

98. Apparatus according to claim 91, and furthermore comprising an elastic retaining element acting on said at least two elements to maintain said at least two elements in said contact position.

99. Apparatus according to claim 80, and furthermore comprising a self-aligning device associated with said at least two elements to prevent misalignments between said at least two elements when said at least two elements move along said arched trajectories.

100. Apparatus according to claim 80, wherein said chamber has a portion provided with a transverse dimension extending transversely to said direction and adjacent to a further portion of lesser transverse dimensions in relation to said transverse dimension.

101. Apparatus according to claim 100, wherein said forming arrangement comprises a first part, said at least two elements being positionable in relation to said first part in such a way that said portion is defined by adjacent zones of said at least two elements and of said first part.

102. Apparatus according to claim 101, wherein said portion is arranged to form on said object a protruding region protruding transversely to said direction in relation to further regions of said object adjacent to said protruding region.

103. Apparatus according to claim 102, wherein said protruding region comprises a collar that protrudes from said object.

104. Apparatus according to claim 101, wherein in said first part a recess is obtained that is suitable for forming an external surface of said object.

105. Apparatus according to claim 104, wherein said recess is arranged inside a casing in which said forming arrangement is partially included.

106. Apparatus according to claim 80, wherein said at least two elements are arranged in the same semispace defined by a contact plane along which said first forming device and said second forming device are in contact with one another in said closed position.

107. Apparatus according to claim 106, wherein with said second forming device at least two further reciprocally movable elements are associated to disengage from said object.

108. Apparatus according to claim 107, wherein said at least two further movable elements are arranged in a further semispace lying on an opposite side of said contact plane in relation to said semispace.

109. Apparatus according to claim 80, wherein said elastic member comprises a belleville-type spring.

110. Apparatus according to claim 80, wherein said elastic member is interposed between said second member and a support suitable for supporting said second member.

111. Apparatus according to claim 110, wherein with said support an actuating element is associated to move said second forming device in said direction.

112. Apparatus according to claim 80, wherein said elastic member is arranged in such a way as to exert on said second member a force directed in said direction.

113. Apparatus according to claim 80, wherein said first forming device is provided with a stop surface suitable for coming into contact, in said closed position, with a further stop surface obtained on said first member.

114. Apparatus according to claim 113, wherein said first forming device comprises a shaping surface suitable for obtaining on said object an end surface.

115. Apparatus according to claim 114, wherein said first member is provided with a further shaping surface suitable for obtaining on said object a further end surface opposite said end surface.

116. Apparatus according to claim 115, wherein said further shaping surface is adjacent to said further stop surface.

117. Apparatus according to claim 115, wherein, in said closed position, said shaping surface and said further shaping surface are placed at a distance corresponding to a maximum dimension of said object in said direction.

118. Apparatus according to claim 80, wherein said first forming device is provided with a first forming surface cooperating with an active surface of said second member to form a wall of said object extending transversely in relation to said direction.

119. Apparatus according to claim 80, wherein said second member comprises a punch suitable for forming an internal surface of said object.

120. Apparatus according to claim 119, wherein said first forming device comprises a die interacting with said punch.

121. Apparatus according to claim 120, wherein said die is partially defined by said at least two elements.

122. Apparatus according to claim 80, wherein said second member is slidable in said direction inside said first member.

123. Apparatus according to claim 80, wherein said forming arrangement comprises a shaping device and a forming and compensator device interacting with said shaping device in said direction to define in said closed position said chamber for forming a dose of plastics, said chamber having a maximum longitudinal dimension in said direction.

124. Apparatus according to claim 123, wherein said forming and compensator device is positionable in relation to said shaping device in such a way as to define a dimension of said chamber in said direction, different from said maximum longitudinal dimension, substantially independent of the weight of said dose.

125. Apparatus according to claim 124, wherein said forming and compensator device is movable in relation to said shaping device in said closed position.

126. Apparatus according to claim 125, wherein, in said closed position, said forming and compensator device is slidable in relation to said shaping device in said direction.

127. Apparatus according to claim 123, wherein said shaping device is provided with an active surface suitable for forming an end surface of said object.

128. Apparatus according to claim 127, wherein said active surface extends transversely in relation to said direction.

129. Apparatus according to claim 127, wherein said forming and compensator device is provided with a respective forming surface suitable for forming a further end surface of said object opposite said end surface.

130. Apparatus according to claim 129, wherein, in said closed position, said respective forming surface and said active surface are placed at a distance from one another that is the same as said maximum longitudinal dimension.

131. Apparatus according to claim 123, wherein said forming and compensator device comprises a punch suitable for forming an internal surface of said object.

132. Apparatus according to claim 127, wherein said forming and compensator device comprises a punch suitable for forming an internal surface of said object, said active surface defining an end region of a die cooperating with said punch to define said chamber.

133. Apparatus according to claim 132, wherein a side region of said die adjacent to said end region is defined by said forming and compensator device.

134. Apparatus according to claim 123, wherein said forming and compensator device comprises said at least two elements.

135. Apparatus according to claim 133, wherein said forming and compensator device comprise said at least two elements, said at least two elements defining said side region.

136. Apparatus according to claim 133, wherein said punch is provided with a forming portion interacting with said side region to form a wall of said object having said dimension.

137. Apparatus according to claim 80, and furthermore comprising a centring element suitable for engaging with said object to support said object when said forming arrangement disengages therefrom.

138. Apparatus according to claim 137, wherein said centring element comprises a protruding member exiting from a respective seat to engage in an opening of said object when said forming arrangement disengages therefrom.

139. Apparatus according to claim 138, wherein said protruding member comprises a stem extending in said direction.

140. Apparatus according to claim 138, wherein said protruding member is movable in said direction to engage in and disengage from said opening.

141. Apparatus according to claim 138, wherein with said protruding member there is associated an elastic element suitable for pushing said protruding member outside said respective seat.

142. Apparatus according to claim 141, wherein said elastic element exerts on said protruding member a force directed in said direction.

143. Apparatus according to claim 138, wherein said forming arrangement comprises a pointed portion suitable for engaging with said protruding member for pushing said protruding member inside said respective seat.

144. Apparatus according to claims 137, wherein said centring element is distinct from said forming arrangement.

145. Apparatus according to claim 80, wherein said forming arrangement is assembled on a carousel that is rotatable around an axis parallel to said direction.

146. Apparatus according to claim 145, wherein with said carousel a plurality of said forming arrangements are associated that are angularly equally spaced apart along a peripheral region of said carousel.

147. Apparatus according to claim 80, wherein said forming arrangement is movable along a path that takes said forming arrangement to interact with a plurality of carousels.

148. Apparatus according to claim 80, wherein said forming arrangement is assembled on a movable shuttle.

149. Apparatus according to claim 80, and comprising a plurality of said forming arrangements positioned in a linear arrangement.

* * * * *